US012572999B2

(12) United States Patent
Xia et al.

(10) Patent No.: US 12,572,999 B2
(45) Date of Patent: Mar. 10, 2026

(54) INCREASING RESOLUTION OF DIGITAL IMAGES USING SELF-SUPERVISED BURST SUPER-RESOLUTION

(71) Applicant: Adobe Inc., San Jose, CA (US)

(72) Inventors: Zhihao Xia, San Jose, CA (US); Michael Gharbi, San Francisco, CA (US); Jiawen Chen, San Jose, CA (US); Goutam Bhat, Zurich (CH)

(73) Assignee: Adobe Inc., San Jose, CA (US)

( * ) Notice: Subject to any disclaimer, the term of this patent is extended or adjusted under 35 U.S.C. 154(b) by 317 days.

(21) Appl. No.: 18/323,233

(22) Filed: May 24, 2023

(65) Prior Publication Data

US 2024/0394834 A1 Nov. 28, 2024

(51) Int. Cl.
*G06K 9/00* (2022.01)
*G06T 3/18* (2024.01)
(Continued)

(52) U.S. Cl.
CPC ............. *G06T 3/4053* (2013.01); *G06T 3/18* (2024.01); *G06T 5/70* (2024.01); *G06T 7/20* (2013.01);
(Continued)

(58) Field of Classification Search
CPC ........ G06V 10/82; G06V 20/41; G06V 40/16; G06V 10/25; G06V 10/454; G06V 20/46; G06V 40/161; G06V 20/47; G06V 30/19173; G06V 10/764; G06V 20/10; G06V 20/52; G06V 40/166; G06V 10/761; G06V 10/811; G06V 20/40;

G06V 20/44; G06V 20/56; G06V 40/165; G06V 40/167; G06V 40/171; G06V 40/172; G06T 2207/20081; G06T 2207/20084;
(Continued)

(56) References Cited

U.S. PATENT DOCUMENTS 9,836,484 B1 * 12/2017 Bialynicka-Birula .......................
G06V 40/172
2018/0137643 A1 * 5/2018 Wang ..................... G06V 10/40
(Continued)

OTHER PUBLICATIONS

Adrian Bulat, J. Yang, and Georgios Tzimiropoulos. To learn image super-resolution, use a GAN to learn how to do image degradation first. In ECCV, 2018.
(Continued)

*Primary Examiner* — Alex Kok S Liew
(74) *Attorney, Agent, or Firm* — Keller Preece PLLC

(57) ABSTRACT

The present disclosure relates to systems, methods, and non-transitory computer-readable media that implements self-supervised training of an image burst model, trained exclusively on low-resolution images. For example, the disclosed system accesses an image burst that includes a plurality of images. The disclosed system generates a high-resolution image estimation from a first subset of images of the plurality of images. Further, the disclosed system generates a set of low-resolution images by modifying the high-resolution image estimation based on parameters of one or more images from the plurality of images. Moreover, the disclosed system determines a measure of loss by comparing the set of low-resolution images with a second subset of images from the plurality of images and updates the image burst model with the determined measure of loss.

20 Claims, 14 Drawing Sheets

100

(51) Int. Cl.
| | |
|---|---|
| *G06T 3/4053* | (2024.01) |
| *G06T 5/70* | (2024.01) |
| *G06T 7/20* | (2017.01) |
| *G06V 10/56* | (2022.01) |

(52) U.S. Cl.
CPC .... *G06V 10/56* (2022.01); *G06T 2207/20084*
(2013.01)

(58) Field of Classification Search
CPC ......... G06T 3/4053; G06T 2207/10016; G06T
7/11; G06T 5/50; G06T 2207/10024;
G06T 2207/20016; G06T 2207/20208;
G06T 2207/20212; G06T 2207/20221;
G06T 11/60
See application file for complete search history.

(56) References Cited

U.S. PATENT DOCUMENTS

| | | | | |
|---|---|---|---|---|
| 2018/0336662 A1* | 11/2018 | Kimura | .................... | G06T 5/70 |
| 2019/0316548 A1* | 10/2019 | Wolk | ..................... | F02M 26/17 |
| 2021/0248751 A1* | 8/2021 | Guo | .......................... | G06T 7/11 |
| 2022/0122223 A1* | 4/2022 | Choi | ......................... | G06T 5/70 |

OTHER PUBLICATIONS

Akshay Dudhane, Syed Waqas Zamir, Salman Khan, Fahad Shahbaz Khan, and Ming-Hsuan Yang. Burst image restoration and enhancement. In CVPR, 2022.

Andreas Lugmayr, Martin Danelljan, and R. Timofte. Unsupervised learning for real-world super-resolution. 2019 IEEE/CVF International Conference on Computer Vision Workshop (ICCVW), pp. 3408-3416, 2019.

Andrey Ignatov, Luc Van Gool, and Radu Timofte. Replacing mobile camera isp with a single deep learning model. arXiv preprint arXiv:2002.05509, 2020.

B. Bascle, A. Blake, and Andrew Zisserman. Motion deblurring and super-resolution from an image sequence. In *ECCV*, 1996.

B. Wronski, Ignacio Garcia-Dorado, M. Ernst, D. Kelly, Michael Krainin, Chia-Kai Liang, M. Levoy, and P. Milanfar. Handheld multi-frame super-resolution. ACM Transactions on Graphics (TOG), 38:1-18, 2019.

Bruno Lecouat, Jean Ponce, and Julien Mairal. Lucas-kanade reloaded: End-to-end super-resolution from raw image bursts. 2021 IEEE/CVF International Conference on Computer Vision (ICCV), pp. 2350-2359, 2021.

Bruno Lecouat, Thomas Eboli, Jean Ponce, and Julien Mairal. High dynamic range and super-resolution from raw image bursts. ACM Transactions on Graphics (TOG), 41(4), Jul. 2022.

Chang Wen Chen, Zhiwei Xiong, Xinmei Tian, Zhengjun Zha, and Feng Wu. Camera lens super-resolution. In CVPR, 2019.

Deqing Sun, X. Yang, Ming-Yu Liu, and J. Kautz. Pwc-net: Cnns for optical flow using pyramid, warping, and cost volume. 2018 IEEE/CVF Conference on Computer Vision and Pattern Recognition, pp. 8934-8943, 2018.

Goutam Bhat, Martin Danelljan, Fisher Yu, Luc Van Gool, and Radu Timofte. Deep reparametrization of multi-frame super-resolution and denoising. In Proceedings of the IEEE/CVF International Conference on Computer Vision, pp. 2460-2470, 2021.

Goutam Bhat, Martin Danelljan, L. Gool, and R. Timofte. Deep burst super-resolution. In CVPR, 2021.

Jaakko Lehtinen, Jacob Munkberg, Jon Hasselgren, Samuli Laine, Tero Karras, Miika Aittala, and Timo Aila. Noise2noise: Learning image restoration without clean data. In ICML, 2018.

Jianrui Cai, Hui Zeng, Hongwei Yong, Zisheng Cao, and Lei Zhang. Toward real-world single image super-resolution: A new benchmark and a new model. In Proceedings of the IEEE International Conference on Computer Vision, 2019.

Kai Zhang, Jingyun Liang, Luc Van Gool, and Radu Timofte. Designing a practical degradation model for deep blind image super-resolution. In IEEE International Conference on Computer Vision, pp. 4791-4800, 2021.

Kai Zhang, Wangmeng Zuo, and Lei Zhang. Learning a single convolutional super-resolution network for multiple degradations. In IEEE Conference on Computer Vision and Pattern Recognition, pp. 3262-3271, 2018.

M. Irani and Shmuel Peleg. Improving resolution by image registration. CVGIP Graph. Model. Image Process., 53:231-239, 1991.

Michael Elad and A. Feuer. Restoration of a single super-resolution image from several blurred, noisy, and undersampled measured images. IEEE transactions on image processing : a publication of the IEEE Signal Processing Society, 6 12:1646-58, 1997.

Ngoc Long Nguyen, Je're'my Anger, Axel Davy, Pablo Arias, and G. Facciolo. Self-supervised multi-image super-resolution for push-frame satellite images. 2021 IEEE/CVF Conference on Computer Vision and Pattern Recognition Workshops (CVPRW), pp. 1121-1131, 2021.

R. Hardie, K. Barnard, John G. Bognar, E. Armstrong, and E. Watson. High-resolution image reconstruction from a sequence of rotated and translated frames and its application to an infrared imaging system. Optical Engineering, 37:247-260, 1998.

Samuel W. Hasinoff, Dillon Sharlet, Ryan Geiss, Andrew Adams, Jonathan T. Barron, Florian Kainz, Jiawen Chen, and Marc Levoy. Burst photography for high dynamic range and ow-light imaging on mobile cameras. ACM Transactions on Graphics (Proc. SIGGRAPH Asia), 35(6), 2016.

Shunta Maeda. Unpaired image super-resolution using pseudo-supervision. In CVPR, 2020.

Sina Farsiu, Michael Elad, and P. Milanfar. Multiframe demosaicing and super-resolution from undersampled color images. In IS&T/SPIE Electronic Imaging, 2004.

Singanallur Venkatakrishnan, Charles A. Bouman, and Brendt Wohlberg. Plug-and-play priors for model based reconstruction. 2013 IEEE Global Conference on Signal and Information Processing, pp. 945-948, 2013.

Stanley H. Chan, Xiran Wang, and Omar A. Elgendy. Plug- and-play admm for image restoration: Fixed-point convergence and applications. IEEE Transactions on Computational Imaging, 3:84-98, 2017.

T. Brooks, Ben Mildenhall, Tianfan Xue, Jiawen Chen, Dillon Sharlet, and J. Barron. Unprocessing images for learned raw denoising. 2019 IEEE/CVF Conference on Computer Vision and Pattern Recognition (CVPR), pp. 11028-11037, 2019.

Thibaud Ehret, Axel Davy, G. Facciolo, Jean-Michel Morel, and Pablo Arias. Model-blind video denoising via frame-to-frame training. In CVPR, 2019.

Thibaud Ehret, Axel Davy, Pablo Arias, and G. Facciolo. Joint demosaicking and denoising by fine- tuning of bursts of raw images. 2019 IEEE/CVF International Conference on Computer Vision (ICCV), pp. 8867-8876, 2019.

Valentin Wolf, Andreas Lugmayr, Martin Danelljan, Luc Van Gool, and Radu Timofte. DeFlow: Learning complex image degradations from unpaired data with conditional flows. In CVPR, 2021.

X. Zhang, Qi feng Chen, R. Ng, and V. Koltun. Zoom to learn, learn to zoom. 2019 IEEE/CVF Conference on Computer Vision and Pattern Recognition (CVPR), pp. 3757-3765, 2019.

Xiaozhong Ji, Yun Cao, Ying Tai, Chengjie Wang, Jilin Li, and Feiyue Huang. Real-world super-resolution via kernel estimation and noise injection. In The IEEE/CVF Conference on Computer Vision and Pattern Recognition (CVPR) Workshops, Jun. 2020.

Xintao Wang, Liangbin Xie, Chao Dong, and Ying Shan. Real-esrgan: Training real-world blind super-resolution with pure synthetic data. In International Conference on Computer Vision Workshops (ICCVW), 2021.

Yuan Yuan, Siyuan Liu, Jiawei Zhang, Yongbing Zhang, Chao Dong, and Liang Lin. Unsupervised image super-resolution using cycle-in-cycle generative adversarial networks. In CVPRW, 2018.

Ze Liu, Yutong Lin, Yue Cao, Han Hu, Yixuan Wei, Zheng Zhang, Stephen Lin, and Baining Guo. Swin transformer: Hierarchical vision transformer using shifted windows. In Proceedings of the IEEE/CVF International Conference on Computer Vision, pp. 10012-10022, 2021.

(56) References Cited

OTHER PUBLICATIONS

Zhengxiong Luo, Yan Huang, , Shang Li, Liang Wang, and Tieniu Tan. Learning the degradation distribution for blind image super-resolution. In CVPR, 2022.

Zhihao Xia and Ayan Chakrabarti. Training image estimators without image ground-truth. In NeurIPS, 2019.

Ziwei Luo, Lei Yu, Xuan Mo, Youwei Li, Lanpeng Jia, Haoqiang Fan, Jian Sun, and Shuaicheng Liu. Ebsr: Feature enhanced burst super-resolution with deformable alignment. In Proceedings of the IEEE/CVF Conference on Computer Vision and Pattern Recognition (CVPR) Workshops, pp. 471-478, Jun. 2021.

Ziwei Luo, Youwei Li, Shen Cheng, Lei Yu, Qi Wu, Zhihong Wen, Haoqiang Fan, Jian Sun, and Shuaicheng Liu. Bsrt: Improving burst super-resolution with swin transformer and flow-guided deformable alignment. In Proceedings of the IEEE/CVF Conference on Computer Vision and Pattern Recognition, pp. 998-1008, 2022.

* cited by examiner

Client Device 112

Image Capturing Application 110

High-Resolution Image Generation System 102

Network 108

Server(s) 106

Image Generation System 104

High-Resolution Image Generation System 102

100

| | | Known | | | Unit Impulse Read & Shot. Mix | Gaussian Isotropic Read & Shot. Mix | Gaussian Isotropic Read & Shot. Fixed | Gaussian Isotropic Only read. Fixed | Gaussian Anisotropic Read & Shot. Mix |
|---|---|---|---|---|---|---|---|---|---|
| | | $y$ | $k$ | $m_q$ | | | | | |
| 600 (I) | Fully Sup. SISR | ✓ | | | 34.681 | 34.074 | 35.767 | 35.557 | 34.683 |
| 602 (II) | Fully Sup. burst SR | ✓ | ✓ | | 39.810 | 37.254 | 39.002 | 38.761 | 37.590 |
| 604 (III) | Self Sup. known $k$, $m_q$ | ✗ | ✓ | ✓ | 40.359 | 36.765 | 38.469 | 38.236 | 37.040 |
| 606 (IV) | Self Sup. known $k$ | ✗ | ✓ | ✗ | 38.999 | 36.347 | 37.872 | 37.577 | 36.544 |
| 608 (V) | Self Sup. fixed $k$ | ✗ | ✗ | ✗ | 28.328 | 28.575 | 28.970 | 29.493 | 34.822 |
| 610 (VI) | Self Sup. learned $k$ | ✗ | ✗ | ✗ | 38.320 | 35.683 | 36.966 | 37.165 | 36.205 |

Computing Device *1000*

Image Generation System *1000*

High-Resolution Image Generation System *102*

Image Burst Manager *1002*

High-Resolution Image Generator *1004*

Low-Resolution Image Generator *1005*

Loss Manager *1006*

Updating Manager *1008*

Image Capturer *1010*

GUI Manager *1012*

1100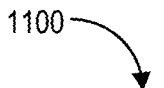

Accessing An Image Burst *1102*

Generating A High-Resolution Image Estimation From The Image Burst *1104*

Generating A Set Of Low-Resolution Images By Modifying The High-Resolution Image Estimation *1106*

Determining A Measure Of Loss By Comparing The Set Of Low-Resolution Images With A Second Subset Of Images *1108*

Updating The Image Burst Neural Network By Back-Propagating The Measure Of Loss *1110*

*Fig. 11*

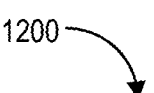
1200
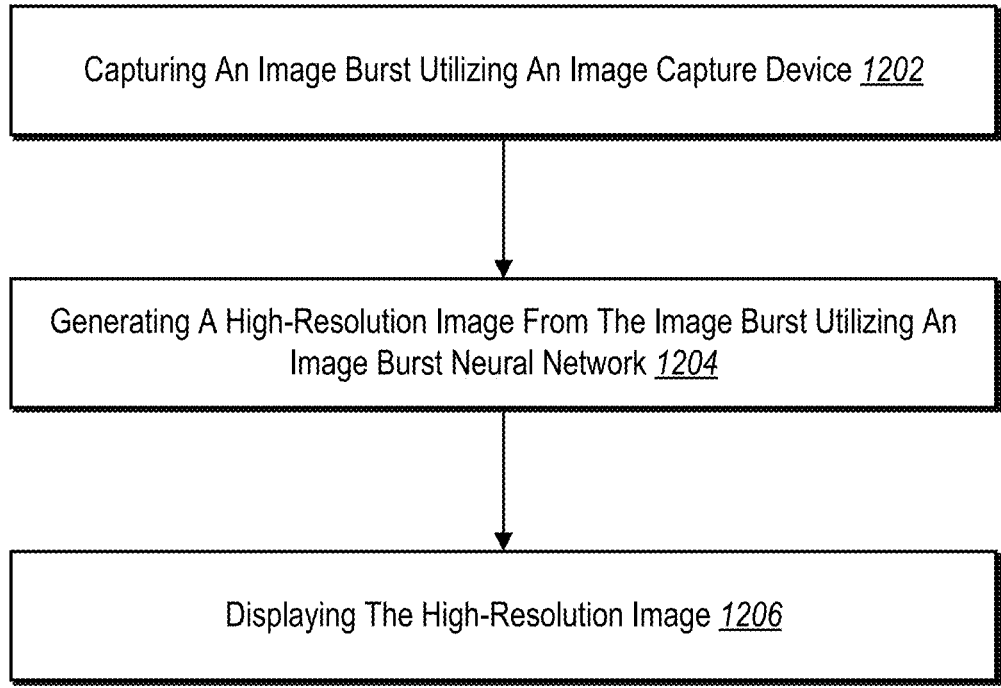
Capturing An Image Burst Utilizing An Image Capture Device *1202*
Generating A High-Resolution Image From The Image Burst Utilizing An Image Burst Neural Network *1204*
Displaying The High-Resolution Image *1206*
*Fig. 12*

INCREASING RESOLUTION OF DIGITAL IMAGES USING SELF-SUPERVISED BURST SUPER-RESOLUTION

BACKGROUND

Recent years have seen significant advancement in hardware and software platforms for enabling devices, such as smart phones, to capture high-quality digital images. As camera on smart phones have improved, camera phones have replaced traditional camera devices for many people. Despite the increased ease to capture images, often the images captured using camera phones are low-resolution or have other undesired qualities.

SUMMARY

One or more embodiments described herein provide benefits and/or solve one or more of the problems in the art with systems, methods, and non-transitory computer-readable media that perform burst super-resolution utilizing a model trained utilizing self-supervision. For example, the disclosed system utilizes noisy low-resolution image bursts for training an image burst model. In particular, the disclosed system utilizes high-frequency data present within an image burst for training supervision. Furthermore, the disclosed system during training, intelligently determines modifications of parameters for the image burst model and operations of an image formation model. Accordingly, the disclosed system employs in-the-wild data to train image burst models and robustly accounts for the presence of dynamic motion in captured image bursts. Thus, the disclosed system implements self-supervised training of image burst models with low-resolution images. Moreover, post-training of image burst models, the disclosed system generates high-resolution images from a captured low-resolution image burst.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 6 illustrates an example table of the implemented self-supervised training by the high-resolution image generation system in accordance with one or more embodiments;

FIG. 11 illustrates a flowchart of a series of acts for updating the image burst neural network in accordance with one or more embodiments;

FIG. 12 illustrates a flowchart of a series of acts for generating a high-resolution image in accordance with one or more embodiments;

DETAILED DESCRIPTION

Figure 1:
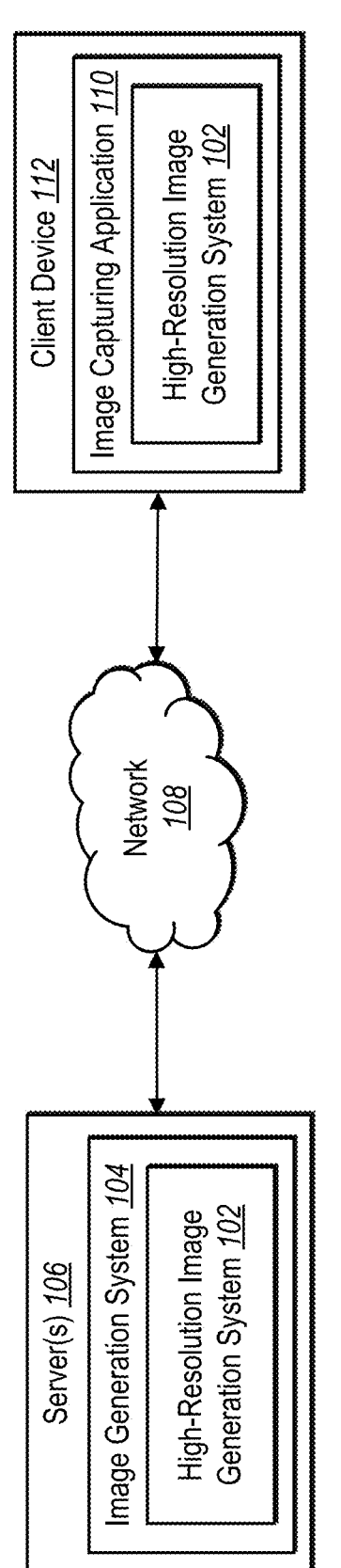
FIG. 1 illustrates an example environment in which a high-resolution image generation system operates in accordance with one or more embodiments.

One or more embodiments described herein include a high-resolution image generation system that utilizes self-supervised training for burst super-resolution. For example, in one or more embodiments, the high-resolution image generation system is trained utilizing self-supervision for burst super-resolution that exclusively utilizes noisy low-resolution bursts. In such embodiments, the high-resolution image generation system eliminates the requirement for computationally inefficient, inaccurate, and inflexible data collection.

In particular, the high-resolution image generation system accesses/captures an image burst that includes multiple images. Further, with the accessed/captured image burst, the high-resolution image generation system partitions the image burst into a first subset and a second subset. Moreover, the high-resolution image generation system utilizes the first subset of the image burst as input to an image burst model to generate a high-resolution image estimation. Additionally, the high-resolution image generation system passes the high-resolution image estimation through an image formation model that simulates a real-world degradation process. For instance, the high-resolution image generation system, utilizing the image formation model generates a set of reconstructed low-resolution images for comparison against the second subset of images from the image burst. The high-resolution image generation system determines a measure of loss via a comparison between the set of reconstructed low-resolution images and the second subset of images. Accordingly, the high-resolution image generation system determines the measure of loss and accurately trains the image burst model to generate high-resolution images despite lacking direct ground-truth supervision.

As just mentioned, the high-resolution image generation system implements self-supervised training for burst super-resolution. In one or more embodiments, the high-resolution image generation system implements a generalized self-supervised training approach, which allows for the high-resolution image generation system to train any neural network architecture with captured low-resolution image bursts. In particular, by implementing the self-supervised training for burst super-resolution, the high-resolution image generation system flexibly adapts to various image capturing devices (e.g., cameras) to assist in generating high-resolution images from low-resolution image bursts. As explained in more detail below, because the high-resolution image generation system is trained with real images rather than synthetic images, the high-resolution image generation system is able to work with real-world image bursts.

Additionally, in one or more embodiments, the high-resolution image generation system utilizes a motion estimation model to account for movements (e.g., a shaking hand or other natural movements in real-world scene motion). In particular, the high-resolution image generation system via the motion estimation model determines motion parameters of objects within the image burst. Specifically, by determining motion parameters, the high-resolution image generation system modifies the above-mentioned high-resolution image estimation to generate a set of low-resolution images. For instance, the high-resolution image generation system utilizes the motion parameters to modify a warping operation of the high-resolution image estimation at the image formation model.

As just mentioned, the high-resolution image generation system includes the warping operation at the image formation model. In one or more embodiments, the image formation model also includes a blurring operation, downsampling of the high-resolution image estimation and a mosaic operation. In particular, the image formation model utilizes each of the operations to generate the set of low-resolution images. For instance, the warping operation, the blurring operation, and the mosaic operation assist the high-resolution image generation system in simulating a degradation process of the image quality.

In one or more embodiments, the high-resolution image generation system further utilizes validity masks. In particular, the validity masks assist the high-resolution image generation system in accounting for dynamic objects that appear in some image frames of the image burst but not in other image frames of the image burst. For instance, by utilizing the validity masks, the high-resolution image generation system accurately compares the set of low-resolution images with the second subset of the image burst to determine a measure of loss.

As mentioned above, conventional image capturing systems utilize raw burst image super-resolution to improve the quality of digital images. For example, conventional image capturing systems adopt a synthetic data generation pipeline to generate realistic image bursts and their corresponding high-resolution ground truth image for training the raw burst super-resolution model. However, despite the efforts of conventional image capturing systems, the utilization of synthetic data generation pipelines results in poor-quality images. Specifically, the poor-quality of images from utilizing synthetic data generation pipelines is due to a failure of conventional image capturing systems to model noise distribution, blur kernels, camera trajectory (e.g., movement of the camera during capturing of image bursts), and object motion in real image bursts, and therefore, generalizes poorly when applied in real-world scenarios.

Moreover, in some instances, conventional image capturing systems attempt to utilize weakly-paired datasets to generate high-quality image bursts. For example, weakly-paired datasets include collecting high-resolution ground truth digital images with a device such as a DSLR camera and a zoom lens on a tripod. However, utilizing weakly-paired datasets also results in flawed digital image bursts due to spatial misalignment, a lack of scene motion, and the use of a different image capture device (e.g., the use of a different image capture device results in mismatched image characteristics such as color quality).

The high-resolution image generation system provides several advantages over conventional image capturing systems. In one or more embodiments, the high-resolution image generation system operates more efficiently than conventional image capturing systems. In particular, the high-resolution image generation system by accessing an image burst, generating a set of low-resolution images, and determining a measure of loss by comparing the set of low-resolution images with a second subset of images from the image burst results in the high-resolution image generation system efficiently training image burst models. For instance, rather than the methods of utilizing a synthetic data generation pipeline for training an image burst model or utilizing weakly paired datasets for training, the high-resolution image generation system, in one or more embodiments, utilizes low-resolution images from an image burst to train image burst models. Accordingly, the high-resolution image generation system improves upon efficiency of conventional image capturing systems by simplifying the dataset for training an image burst model (e.g., by exclusively using low-resolution images from an image burst).

In addition to the efficiency improvements, the high-resolution image generation system in one or more embodiments also improves upon accuracy of conventional image capturing systems. For example, the high-resolution image generation system improves accuracy by generating a set of low-resolution images via modifying a generated high-resolution image estimation based on parameters of a second subset of images from the image burst. Further, the high-resolution image generation system also improves accuracy by determining a measure of loss by comparing the set of low-resolution images with the second subset of images, and updating the image burst neural network and blurring operation. Specifically, the high-resolution image generation system improves upon by conventional image capturing systems by exclusively utilizing low-resolution images to train the image burst model. For instance, by exclusively utilizing low-resolution images, the high-resolution image generation system accurately models noise distribution, blur kernels, camera trajectory (e.g., movement of the camera during capturing of image bursts), and object motion in image bursts. Accordingly, the high-resolution image generation system overcomes the accuracy issues prevalent in conventional image capturing systems.

Further, in addition to the efficiency and accuracy improvements, the high-resolution image generation system in one or more embodiments also improves upon functional flexibility. For example, the high-resolution image generation system enables training for a variety of image capturing devices and neural network architectures by implementing a self-supervised training for image burst models with exclusively low-resolution images. In particular, by generating a set of low-resolution images and determining a measure of loss to update the image burst neural network and image formation model, the high-resolution image generation system eliminates the need for sophisticated and difficult data collection methods (e.g., the synthetic data pipelines and weakly paired datasets). For instance, the high-resolution image generation system flexibly adapts, and trains image burst models specific to the image capturing device and neural network architecture.

Additional detail regarding the transparency properties system will now be provided with reference to the figures. For example, FIG. 1 illustrates a schematic diagram of an exemplary system environment 100 in which the high-resolution image generation system 102 operates. As illustrated in FIG. 1, the system environment 100 includes a server(s) 106, an image generation system 104, a network 108, a client device 112, and an image capturing application 110.

Although the system environment 100 of FIG. 1 is depicted as having a particular number of components, the system environment 100 is capable of having any number of additional or alternative components (e.g., any number of servers, client devices, or other components in communication with the high-resolution image generation system 102 via the network 108). Similarly, although FIG. 1 illustrates a particular arrangement of the server(s) 106, the network 108, and the client device 112, various additional arrangements are possible.

The server(s) 106, the network 108, and the client device 112 are communicatively coupled with each other either directly or indirectly (e.g., through the network 108 discussed in greater detail below in relation to FIG. 12). Moreover, the server(s) 106 and the client device 112 include one or more of a variety of computing devices (including one or more computing devices as discussed in greater detail with relation to FIG. 12).

As mentioned above, the system environment 100 includes the server(s) 106. In one or more embodiments, the server(s) 106 access image burst that includes multiple digital images, generates high-resolution image estimation from the image burst, and generates a set of low-resolution images to further determine a measure of loss. In one or more embodiments, the server(s) 106 comprises a data server. In some implementations, the server(s) 106 comprises a communication server or a web-hosting server.

In one or more embodiments, the client device 112 includes computing devices that are able to capture, generate and/or provide, for display, high-resolution digital images on the image capturing application 110. For example, the client device 112 includes smartphones, tablets, desktop computers, laptop computers, head-mounted-display devices, or other electronic devices. The client device 112 includes one or more applications (e.g., a digital image capture application) for capturing digital images in accordance with the image generation system 104. For example, in one or more embodiments, the image capturing application 110 works in tandem with the high-resolution image generation system 102 to capture image bursts and train an image burst model for generating high-resolution images. In particular, the image capturing application 110 includes a software application installed on the client device 112. Additionally, or alternatively, the image capturing application 110 of the client device 112 includes a software application hosted on the server(s) 106 which may be accessed by the client device 112 through another application, such as a web browser.

To provide an example implementation, in some embodiments, the high-resolution image generation system 102 on the server(s) 106 supports the high-resolution image generation system 102 on the client device 112. For instance, in some cases, the image generation system 104 on the server(s) 106 trains the high-resolution image generation system 102. The client device 112 obtains (e.g., downloads) the trained high-resolution image generation system 102 from the server(s) 106.

In alternative implementations, the high-resolution image generation system 102 includes a web hosting application that allows the client device 112 to interact with content and services hosted on the server(s) 106. To illustrate, in one or more implementations, the client device 112 accesses a software application supported by the server(s) 106. In response, the high-resolution image generation system 102 on the server(s) 106, trains and generates a high-resolution digital image. The server(s) 106 then provides the high-resolution image to the client device 112 for display.

To illustrate, in some cases, the high-resolution image generation system 102 on the client device 112 receives/captures image bursts. The client device 112 transmits the image burst to the server(s) 106. In response, the high-resolution image generation system 102 on the server(s) 106 trains an image burst model based on the captured image burst. Furthermore, the high-resolution image generation system 102 post-training, transmits the trained image burst model to the client device 112 for generating high-resolution images based on the client device 112 capturing image bursts via the image capturing application 110.

Indeed, the high-resolution image generation system 102 is able to be implemented in whole, or in part, by the individual elements of the system environment 100. For instance, although FIG. 1 illustrates the high-resolution image generation system 102 implemented with regard to the server(s) 106, different components of the high-resolution image generation system 102 are able to be implemented by a variety of devices within the system environment 100. For example, one or more (or all) components of the high-resolution image generation system 102 are implemented by a different computing device (e.g., the client device 112) or a separate server from the server(s) 106. Indeed, as shown in FIG. 1, the client device 112 includes the high-resolution image generation system 102. Example components of the high-resolution image generation system 102 will be described below with regard to FIG. 9.

Figure 2:
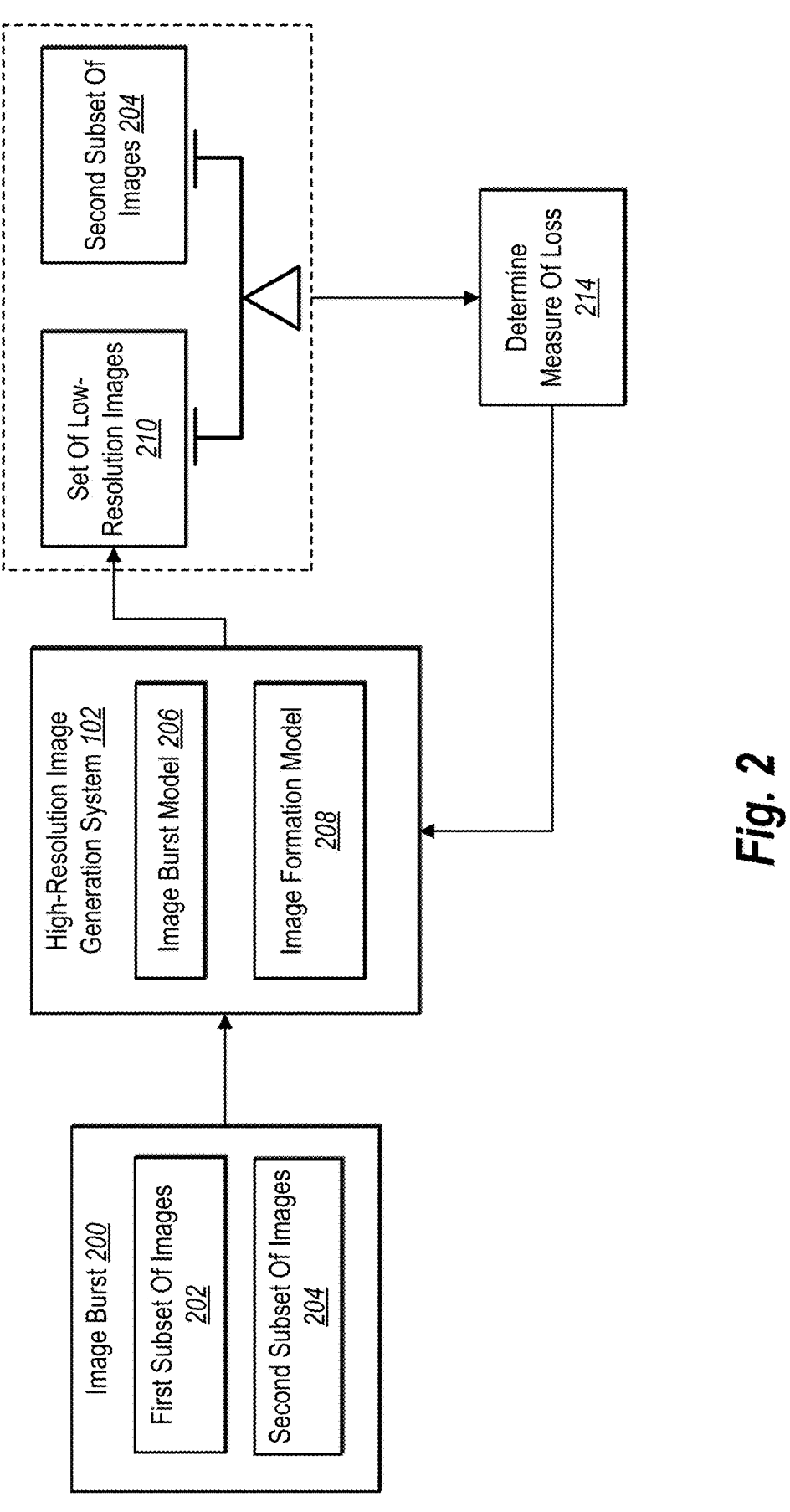
FIG. 2 illustrates an overview of the high-resolution image generation system determining a measure of loss in accordance with one or more embodiments.

FIG. 2 illustrates an overview of the high-resolution image generation system 102 training various components of an image burst model and an image formation model in accordance with one or more embodiments. For example, FIG. 2 illustrates the high-resolution image generation system 102 accessing an image burst 200. In particular, the high-resolution image generation system 102 accesses the image burst 200 from a database with already captured image bursts. In some instances, the high-resolution image generation system 102 accesses the image burst 200 by capturing the image burst 200 via an image capturing device.

As mentioned, the high-resolution image generation system 102 accesses the image burst 200 for further processing. For example, the image burst 200 includes multiple images (e.g., a plurality of images). In particular, the image burst 200 includes accessing/capturing multiple image frames via an image capture device. For instance, the image burst 200 includes utilizing an image capture device to capture a series of images in quick succession. Additionally, the series of images in quick succession in one or more embodiments includes different positions (e.g., trajectories) of the image capturing device. Furthermore, the number of images included in an image burst depends on an image capture device type. Specifically, a certain type of image capture device includes a certain frames per second, which indicates the rate for capturing images. Moreover, the image burst 200 typically includes dynamic objects that appear in some image frames of the image burst 200 and do not appear in other frames of the image burst 200.

As just mentioned, the image burst 200 includes multiple images. For example, an image includes various pictorial elements. In particular, the pictorial elements of the image include pixel values that define the spatial and visual aspects of the digital image. Furthermore, the high-resolution image generation system 102 captures an image by utilizing a digital capture application via an image capture device. For instance, the digital capture application receives a digital image stream at predetermined intervals and captures an image. Capturing the image includes capturing a frame from the digital image stream via the image capture device that receives multiple digital image frames. In the context of the image burst 200, the high-resolution image generation system 102 captures multiple frames from the digital image stream.

As just mentioned, the images include pixel values. Pixel values include an addressable element in an image represented by one or more numerical values. In particular, a pixel value is an element of a picture represented on a display screen and the pixel value describes the brightness of the pixel and a color of the pixel. For example, a pixel includes RGB pixel values between 0 and 255.

Furthermore, FIG. 2 illustrates the image burst 200 including a first subset of images 202 and a second subset of images 204. For example, the high-resolution image generation system 102 partitions the plurality of images of the image burst 200 into the first subset of images 202 and the second subset of images 204. In some embodiments, the high-resolution image generation system 102 randomly partitions the plurality of images of the image burst 200 to form the first subset of images 202 and the second subset of images 204. More details relating to the high-resolution image generation system 102 utilizing the first subset of images 202 and the second subset of images 204 is given below in the description of FIG. 3.

Moreover, FIG. 2 illustrates the high-resolution image generation system 102 processing the first subset of images 202 and the second subset of images 204 of the image burst 200. For example, FIG. 2 shows the high-resolution image generation system 102 processing the first subset of images 202 and the second subset of images 204 with an image burst model 206 and an image formation model 208. More details relating to the image burst model 206 and the image formation model 208 is given below in the description of FIGS. 3 and 4.

As further shown, FIG. 2 illustrates the high-resolution image generation system 102 generating a set of low-resolution images 210. Specifically, in one or more implementations, the high-resolution image generation system 102 exclusively utilizes low-resolution images for self-supervised training. For example, an image is considered low-resolution relative to a high-resolution image. In particular, a low-resolution image includes fewer pixels per inch than a high-resolution image. For instance, a low-resolution image includes images with 72-pixels per inch or lower.

In one or more embodiments, the high-resolution image generation system 102 accesses the image burst 200 with a plurality of images below a predetermined pixels per inch threshold. In some instances, the predetermined pixels per inch threshold includes images below 72-pixels per inch. To illustrate, the high-resolution image generation system 102 accesses the image burst 200 of with a plurality of images with a first resolution. Further, the high-resolution image generation system 102 generates a high-resolution image estimation during training or a high-resolution image post-training with a second resolution, the second resolution being greater than the first resolution. Accordingly, the high-resolution image generation system 102 utilizing low-resolution images (below a certain predetermined pixels per inch threshold) and reduces processing time.

As just mentioned, an image is considered low-resolution relative to a high-resolution image. In particular, a high-resolution image includes more pixels per inch than a low-resolution image. For instance, a high-resolution image can include images with 300-pixels per inch or higher. Accordingly, the high-resolution image generation system 102 generates high-resolution images with a pixels per inch greater than the initially accessed images from the image burst 200. To illustrate, in one or more embodiments, the high-resolution image generation system 102 post-training of the image burst model 206, generates high-resolution images up to 4 times (4×) the resolution of the initially accessed images from the image burst 200.

Furthermore, FIG. 2 illustrates the high-resolution image generation system 102 comparing the set of low-resolution images 210 with the second subset of images 204. In particular, based on the comparison between the set of low-resolution images 210 with the second subset of images 204, the high-resolution image generation system 102 determines a measure of loss 214. Furthermore, the high-resolution image generation system 102 back-propagates the determined measure of loss to the image burst model 206 and the image formation model 208. More details relating to determining the measure of loss and back-propagation to update the models is given below in the description of FIGS. 3-4.

Figure 3:
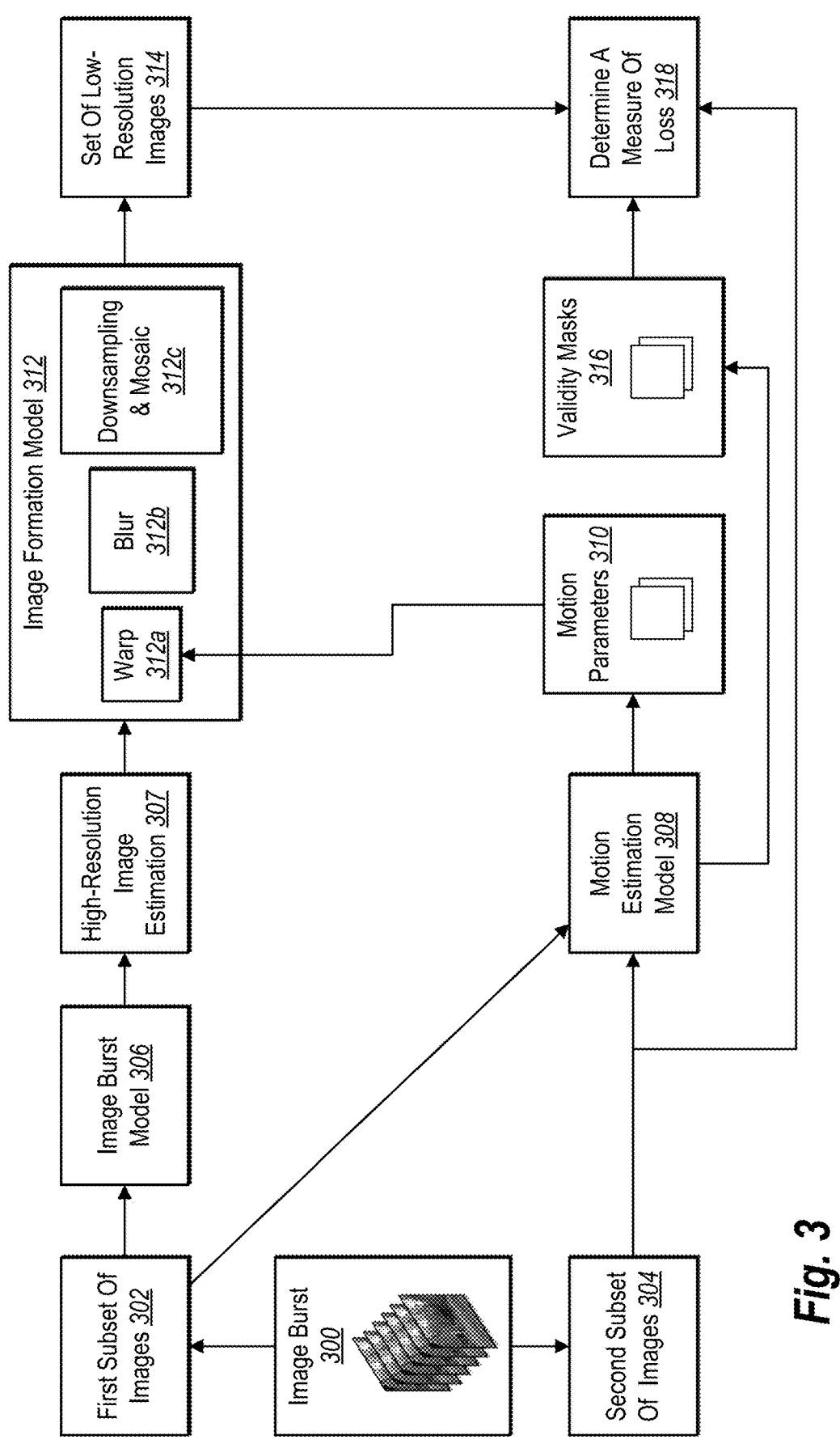
FIG. 3 illustrates a diagram for the high-resolution image generation system utilizing a burst model and an image formation model in accordance with one or more embodiments.

As mentioned above, FIG. 3 illustrates additional details of the high-resolution image generation system 102 for training an image burst model in accordance with one or more embodiments. For example, FIG. 3 shows the high-resolution image generation system 102 accessing an image burst 300 which was discussed previously. In particular, the image burst 300 contains a plurality of images and the high-resolution image generation system 102 splits the image burst 300 into two subsets of images. Specifically, as shown, the high-resolution image generation system 102 splits the image burst 300 into a first subset of images 302 and a second subset of images 304 which was also discussed above in the description of FIG. 2.

In one or more embodiments, the high-resolution image generation system 102 utilizes a mathematical representation to represent the image burst 300. In particular, the high-resolution image generation system 102 mathematically represents the image burst 300 and splits the image burst 300 into two separate subsets. To illustrate, the high-resolution image generation system 102 represents the image burst 300 as the following equation:

$$B = \{b_i\}_{i=1}^{N}$$

For example, in the above equation, B represents the image burst 300 and N represents the number of images. Accordingly, as mentioned, the image burst 300 contains a plurality of images.

Furthermore, in one or more embodiments, the high-resolution image generation system 102 utilizes additional mathematical representations from the above equation to partition the image burst 300 into two separate subsets for training. In particular, the high-resolution image generation system 102 partitions the image burst 300 into two disjoint sets. To illustrate, the high-resolution image generation system 102 represents partitioning the image burst 300 into the first subset of images 302 with the following:

$$B_{model} = \{b_i\}_{i=1}^{K} \tag{1}$$

Additionally, the high-resolution image generation system 102 represents partitioning the image burst 300 into the second subset of images 302 with the following:

$$B_{unseen} = \{b_i\}_{i=K+1}^{N} \tag{2}$$

For instance, the first disjointed set (e.g., the first subset of images 302) includes K images and the second disjointed set (e.g., the second subset of images 304) includes N–K images. Further, for the second subset of images 302 in the above equation includes a subscript of unseen. In particular, the unseen subscript refers to an image burst model 306 not "seeing" the second subset of images. Accordingly, during training, the high-resolution image generation system 102 utilizes the total number of images (e.g., the plurality of images) of the image burst 300, partitions some of the images to the first subset of images 302 and utilizes the remainder images of the image burst 300 as the second subset of images 304. Furthermore, in one or more embodiments, the number of images in the first subset of images 302 is not equal to the number of images in the second subset of images 304. While in other instances, the number of images in the first subset of images 302 is the same as the number of images in the second subset of images 304.

As shown in FIG. 3, the high-resolution image generation system 102 passes the first subset of images 302 to the image burst model 306. In some instances, the image burst model 306 includes a machine learning model. In one or more embodiments a machine learning model includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

Further, in some instances, the image burst model 306 includes a neural network. A neural network includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components.

For example, in one or more embodiments, the image burst model 306 comprises the neural network described by Goutam Bhat, Martin Danelljan, Fisher Yu, Luc Van Gool, and Radu Timofte in *Deep Reparametrization Of Multi-Frame Super-Resolution And Denoising*, In Proceedings of the IEEE/CVF International Conference on Computer Vision, pages 2460-2470, 2021, the entire contents of which are hereby incorporated by reference. In further embodiments, the image burst model 306 comprises the neural network described by Akshay Dudhane, Syed Waqas Zamir, Salman Khan, Fahad Shahbaz Khan, and Ming-Hsuan Yang in *Burst Image Restoration And Enhancement*, Computer Vision and Pattern Recognition, 7 Oct. 2021, available at https://arxiv.org/abs/2110.03680v2, the entire contents of which are hereby incorporated by reference.

As just mentioned, in one or more embodiments, the image burst model 306 includes an image burst neural network. For example, an image burst neural network includes processing and analyzing the first subset of images 302 of the image burst 302. In particular, the image burst neural network processes the first subset of images 302 to generate a high-resolution image estimation 307, or post-training, a high-resolution image.

As just mentioned, the high-resolution image generation system 102 generates the high-resolution image estimation 307 via the image burst model 306. In particular, as mentioned, the high-resolution image generation system 102 processes the first subset of images 302 with the image burst neural network and generates the high-resolution image estimation 307. For instance, the high-resolution image estimation 307 includes the high-resolution image generation system 102 generating a prediction of a high-resolution version of low-resolution images that make up the first subset of images 302. To illustrate, the high-resolution image generation system 102 mathematically represents the output of the image burst model 306 as follows:

$$\hat{y} = f(B_{model})$$

In particular, the $\hat{y}$ represents the high-resolution image estimation 307, f represents the image burst model 306, and as previously discussed ($B_{model}$) represents the first subset of images 302. Accordingly, the high-resolution image generation system 102 processes the first subset of images 302 with the image burst model 306 to generate the high-resolution image estimation 307.

FIG. 3 also shows the high-resolution image generation system 102 processing the first subset of images 302 and the second subset of images 304. For example, the high-resolution image generation system 102 processes the first subset of images 302 and the second subset of images 304 via a motion estimation model 308. In particular, the high-resolution image generation system 102 utilizes the motion estimation model 308 to account for motion of objects between various images within the image burst 300. For instance, the high-resolution image generation system 102 utilizes the motion estimation model 308 to determine a pixel-wise optical flow of images within the image burst 300. Further, the high-resolution image generation system 102 utilizes the motion estimation model 308 to account for object motions and perspective shifts (of the image capture device).

Furthermore, FIG. 3 also shows, the high-resolution image generation system 102 generating motion parameters 310. For example, the high-resolution image generation system 102 processes one or more images from the first subset of images 302 and the second subset of images 304 with the motion estimation model 308 and generates the motion parameters 310. In particular, the motion parameters 310 indicate movement of objects and perspective shifts of the image capture device for images part of the image burst 300. Furthermore, the high-resolution image generation system 102 utilizes the motion parameters 310 to modify the high-resolution image estimation 307 and to generate a set of low-resolution images 314.

In one or more embodiments, the high-resolution image generation system 102 utilizes the motion estimation model 308 to estimate the motion of each image within the first subset of images 302 and the second subset of images 304. In particular, the high-resolution image generation system 102 utilizes the estimated motion for each image of the first subset of images 302 and the second subset of images 304 to modify a warping operation 312a. Specifically, the high-resolution image generation system 102 utilizes the estimated motion for each image of the first subset of images 302 and the second subset of images 304 to modify (e.g., warp) the high-resolution image estimation 307.

In some embodiments, the high-resolution image generation system 102 utilizes the motion estimation model 308 to estimate the motion of one or more images from the image burst. For instance, the high-resolution image generation system 102 utilizes some images from the first subset of images 302 and all the images within the second subset of images 304. Accordingly, the high-resolution image generation system 102 utilizes via the motion estimation model 308 any number of images from the first subset of images 302 and the second subset of images 304 to generate the motion parameters 310.

In one or more embodiments, the high-resolution image generation system 102 mathematically represents a motion parameter as $m_i$. Further, for the high-resolution image generation system 102, the $m_i$ for each image $b_i$ (discussed above) is unknown, as such the high-resolution image generation system 102 estimates the $m_i$ for each image (e.g., $b_i$). In particular, as previously mentioned, the high-resolution image generation system 102 parameterizes the motion parameters $m_i$ as a pixel-wise optical flow which aligns the prediction $\hat{y}$ to input image $b_i$. For instance, by parameterizing the motion parameters as a pixel-wise optical flow, the high-resolution image generation system 102 better accounts for object motions and perspective shifts compared to using a homography (e.g., computer vision perspective transformation).

In one or more implementations, the motion estimation model 308 comprises an optical flow prediction network that predicts the optical flow or motion between image. As used herein, the term "optical flow prediction network" refers to a neural network that is trained using a flow loss function and a ground truth flow to predict the optical flow or motion between images. For example, in one or more embodiments, the image transformation system trains the optical flow prediction network using the flow loss function by comparing the endpoint error (EPE) of pixels between the optical flow prediction for a training image and a ground truth flow. To illustrate, in one or more embodiments, the motion estimation model 308 includes comprises the optical flow prediction network described in U.S. Pat. No. 10,783,622 issued on Sep. 22, 2020, the entire contents of which are hereby incorporated by reference. In alternative implementations, the motion estimation model 308 comprises a PWC-Net as described in Deqing Sun, X. Yang, Ming-Yu Liu, and J. Kautz. Pwcnet: Cnns for optical flow using pyramid, warping, and cost volume. 2018 IEEE/CVF Conference on Computer Vision and Pattern Recognition, pages 8934-8943, 2018, which is hereby incorporated by reference in its entirety.

In some instances, directly computing the optical flow between the prediction $\hat{y}$ to each input image $b_i$ presents difficulties (due to differences in spatial resolution and color space e.g., RGB vs. raw) and can lead to training instabilities. However, the high-resolution image generation system 102 resolves issues of training instabilities by estimating the flow between a first image in the image burst 300 and an i-th image of the image burst 300. Specifically, the high-resolution image generation system 102 bilinearly upsamples to the spatial resolution of the prediction $\hat{y}$ to obtain the motion parameters 310 (e.g., $m_i$). In doing so, the high-resolution image generation system 102 constrains the image burst model 306 (e.g., f) to generate predictions aligned with respect to the first image (e.g., a reference frame) in the image burst 300.

As shown, FIG. 3 further illustrates the high-resolution image generation system 102 utilizing an image formation model 312 to generate the set of low-resolution images 314 from the high-resolution image estimation 307. In particular, the image formation model 312 includes the warping operation 312a, a blurring operation 312b, and a downsampling and mosaic operation 312c.

For example, the high-resolution image generation system 102 performs the warping operation 312a on the high-resolution image estimation 307. In particular, the warping operation 312a includes re-mapping pixels within the high-resolution image estimation 307. For instance, the high-resolution image generation system 102 re-maps pixels within the high-resolution image estimation 307 based on the motion parameters 310. Thus, the re-mapping of pixels within the high-resolution image estimation 307 can be based on the perspective shifts of the image capture device.

Further, the high-resolution image generation system 102 performs the blurring operation 312b on the high-resolution image estimation 307. In particular, the blurring operation includes reducing or distorting details shown in the high-resolution image estimation 307. For instance, the blurring operation 312b includes blurring the high-resolution image estimation 307 based on the type of image capture device.

Moreover, the high-resolution image generation system 102 downsamples the high-resolution image estimation 307 as part of the downsampling and mosaic operation 312c. For example, the high-resolution image generation system 102 utilizes an encoder for downsampling the high-resolution image estimation 307. Each layer of encoder corresponds with a different image resolution of the high-resolution image estimation 307. For instance, downsampling includes moving from a full digital image resolution and moving one resolution lower for each layer of the encoder.

Further, in addition to downsampling as part of the downsampling and mosaic operation 312c, the high-resolution image generation system 102 mosaics the high-resolution image estimation 307. In particular, the mosaic operation includes the high-resolution image generation system 102 removing two color channels at each pixel. For instance, the high-resolution image generation system 102 utilizes the mosaic operation to remove the R and G channel, or the R and B channel, or the G and B channel. In other words, the mosaic operation removes two channels and keeps one channel at each pixel.

In one or more embodiments, the high-resolution image generation system 102 mathematically represents the image formation model 312. In particular, the high-resolution image generation system 102 represents a relationship between generating the set of low-resolution images 314 and the image formation model 312. To illustrate, the high-resolution image generation system 102 represents the image formation model 312 as:

$$\Pi_{m_i,k}$$

In particular, the $\Pi$ represents a product operator for the motion parameters and the images from the image burst 300.

Furthermore, the relationship between the set of low-resolution images 314 and the image formation model 312 includes:

$$\hat{b}_i = \prod_{m_i,k} (f(B_{model}))$$

In other words, the high-resolution image generation system 102 parameterizes the image formation model 312 by the motion $m_i$ from image frame i to the high-resolution image estimation 307 and a lens blur kernel k. Moreover, the high-resolution image generation system 102 utilizes the image formation model 312 to model the degradation of the high-resolution image estimation 307. To illustrate:

$$\prod_{m_i,k} (y) = HD_k\phi_{m_i}(y) + n_i$$

In other words, the high-resolution image generation system 102 first warps the high-resolution image estimation 307 by $\phi$ to account for camera motion $m_i$. Further, the high-resolution image generation system 102 then blurs the warped high-resolution image estimation by the lens blur $D_k$ and the image is then subsampled and mosaicked by a linear operator H. Moreover, the high-resolution image generation system 102 corrupts the mosaicked image by sensor noise $n_i$ to obtain a final noise observation (e.g., $b_i$ or the set of low-resolution images 314). Accordingly, the high-resolution image generation system 102 generates the set of low-resolution images 314 from the high-resolution image estimation 307 utilizing the image formation model 312.

As further shown, FIG. 3 illustrates the high-resolution image generation system 102 utilizing validity masks 316. For example, the high-resolution image generation system 102 utilizes the validity masks for one or more images of the image burst 300. In particular, the validity masks 316 include the high-resolution image generation system 102 utilizing an expression that compares inputs to specified rules to determine whether the inputs are valid. For instance, the high-resolution image generation system 102 utilizes the validity masks 316 to indicate which pixels within images can reliably be utilized for determining a reconstruction loss. For example, validity masks aid the high-resolution image generation system 102 in accounting for an object that appears in one frame of the image burst but does not appear in other frames of the image burst (e.g., a person walking in the background of a first image but no visible person walking in a second image). The following paragraphs provide context for the utility of the validity masks 316.

As mentioned above, the high-resolution image generation system 102 determines the motion parameters 310 ($m_i$). The motion parameters 310 contain errors especially in the presence of noise in the images of the image burst 300. In particular, as mentioned, the images in the image burst 300 include dynamic objects and occlusions (in some images and not in others) which results in difficulty determining an accurate alignment between the motion parameters 310 (e.g., optical flow estimate) and the images in the image burst 300. Without the validity masks 316, the high-resolution image generation system 102 is unable to accurately determine a reconstruction error for regions of image(s) in the image burst that contain dynamic objects. Accordingly, the high-resolution image generation system 102 utilizes the validity masks 316 to rectify this issue.

As an example of how the validity masks 316 aid the high-resolution image generation system 102 in rectifying the issue of accurately determining reconstruction error, consider the warping operation 312a. In particular, the warping operation 312a includes a warping residual which indicates the difference between the actual positions of corresponding points in the first image and an i-th image. For instance, the warping residual measures the accuracy of alignment. The smaller the warping residual, the better the alignment. Accordingly, for the magnitude of a warping residual from the warping operation 312a, the warping residual is expected to be high at regions of misalignment and occlusion. On the other hand, the warping residual is expected to be low where the optical flow is accurate. However, due to noise and aliasing in the images of the image burst 300, the warping residual can be high at well-aligned regions. Discarding regions of the images merely due to a high warping residual would result in discarding useful information for denoising and super-resolution. To combat this issue, the high-resolution image generation system 102 utilizes the validity masks 316 to filter the warping residual and preserve regions that contain useful information. Specific mathematical representations of the validity masks 316 are given later below in context of determining a measure of loss 318.

As shown, FIG. 3 illustrates the high-resolution image generation system 102 utilizing the set of low-resolution images 314, the second subset of images 304 and the validity masks 316 to determine the measure of loss 318. In one or more embodiments, the loss function for determining the measure of loss 318 includes an L1 (least absolute deviations) loss function, an L2 (least square errors) loss function, mean squared error loss function, mean absolute error loss function, Huber loss function, and cross-entropy loss function. In particular, the high-resolution image generation system 102 utilizes the L1 loss function as the L1 loss function is more robust to clipped noise in images. For instance, the high-resolution image generation system 102 compares the set of low-resolution images 314 with the second subset of images 304 to determine the measure of loss 318 based on the validity masks 316. To illustrate, the high-resolution image generation system 102 utilizes the following reconstruction error:

$$l = \frac{1}{N-K} \sum_{i=K+1}^{N} \left\| b_i - \prod_{m_i,k} (f(B_{model})) \right\|_1$$

In other words, the mathematical representation above represents a summation of the comparison between the set of low-resolution images 314 with the second subset of images 304 to determine the measure of loss 318.

Further, as mentioned above, the high-resolution image generation system 102 utilizes the validity masks 316 to determine the measure of loss. In particular, the high-resolution image generation system 102 filters residuals (e.g., the warping residual discussed above) with a predetermined filter. For instance, the high-resolution image generation system 102 utilizes a Gaussian low-pass filter (e.g., F) with a standard deviation of 2.7 pixels. To illustrate, the filter is mathematically represented as:

$$\left| F(b_i) - F(\phi_{m_i}(b_1)) \right|$$

As mentioned previously, the estimation of the optical flow includes estimating the flow between the first image of the image burst 300 and the i-th image. The above equation represents the validity masks 316 to accurately determine the measure of reconstruction loss. Accordingly, utilizing the above equation, the high-resolution image generation system 102 thresholds the filtered residual and applies a morphological dilation to suppress thresholding noise for a final reconstruction loss of:

$$l = \frac{1}{N-K} \sum_{i=K+1}^{N} \left\| v_i \odot \left( b_i - \prod_{m_{i,k}} (f(B_{model})) \right) \right\|_1$$

As such, the final reconstruction loss utilizes a point wise multiplication with the validity masks 316.

Figure 4:
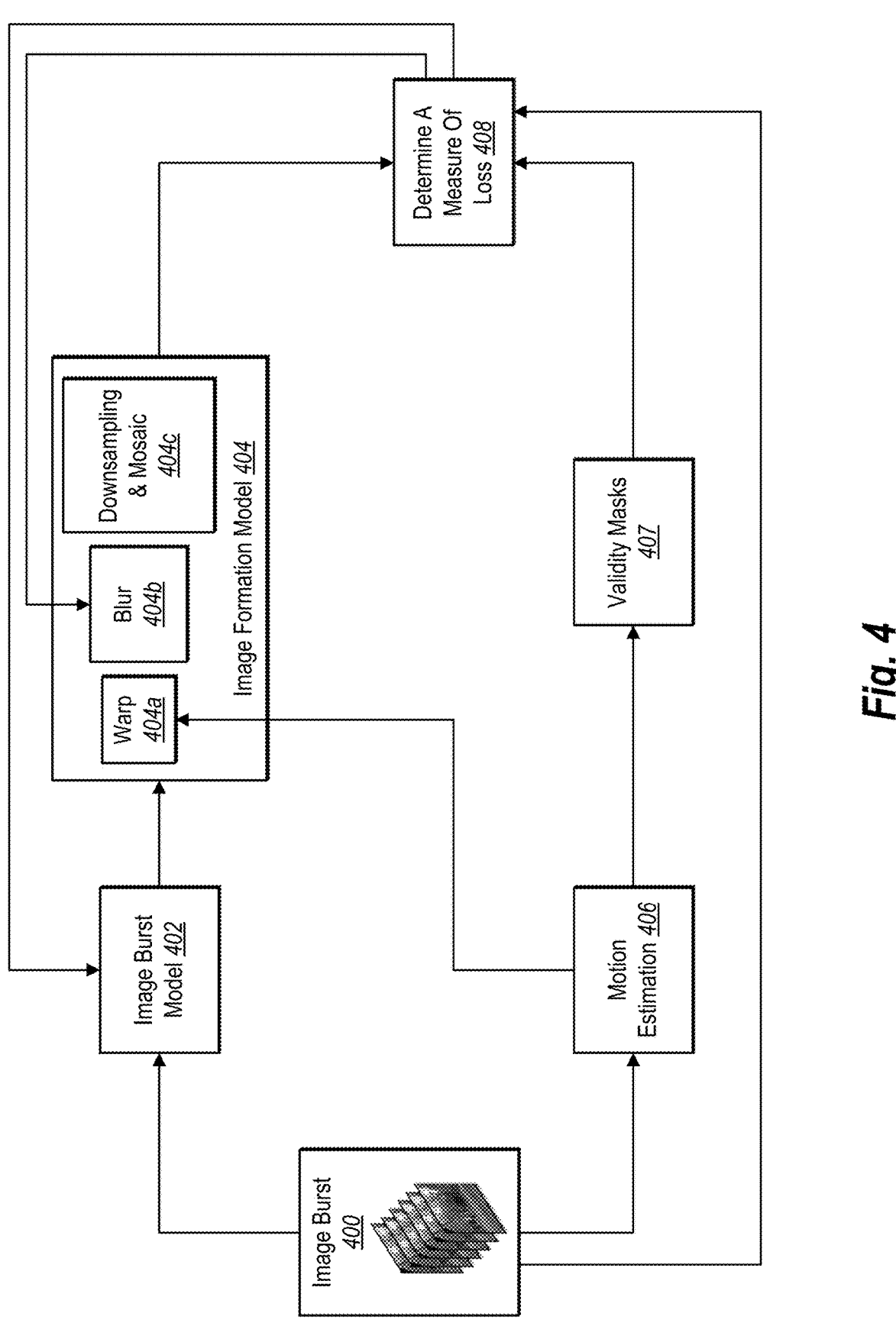
FIG. 4 illustrates a diagram of the high-resolution image generation system back-propagating the determined measure of loss to the image formation model and the burst model in accordance with one or more embodiments.

FIG. 4 illustrates back-propagating a determination of loss in accordance with one or more embodiments. As already discussed in relation to FIG. 3, FIG. 4 also shows determining a measure of loss 408. For example, FIG. 4 shows an image burst 400, an image burst model 402, a motion estimation model 406, an image formation model 404 (along with a warping operation 404*a*, a blurring operation 404*b*, and a downsampling and mosaic operation 404*c*), and validity masks 407. In particular, as already discussed above, the high-resolution image generation system 102 determines the measure of loss 408.

As previously discussed, the high-resolution image generation system 102 in one or more embodiments utilizes a loss function. Specifically, the high-resolution image generation system 102 utilizes a loss function to determine a measure of reconstruction loss. For example, reconstruction loss measures the degree of closeness of a decoder output to the original output by utilizing a mean-squared error. In other words, the reconstruction loss measures a fidelity between the second subset of images of the image burst 400 and the set of low-resolution images generated from the image formation model 404.

Furthermore, FIG. 4 shows the high-resolution image generation system 102 back-propagating the measure of loss 408. In particular, the high-resolution image generation system 102 back-propagates the measure of loss 408 to various models. For instance, the high-resolution image generation system 102 back-propagates the measure of loss to the image burst model 402 and the image formation model 404. Specifically, the high-resolution image generation system 102 modifies parameters of the image burst model 402 based on the determined measure of loss. Moreover, the high-resolution image generation system 102 modifies parameters of the blurring operation 404*b* of the image formation model 404.

Although FIGS. 3 and 4 shows the high-resolution image generation system 102 utilizing the image formation model 404 (or the image formation model 312 for FIG. 3) which includes the warping operation 404*a*, the blurring operation 404*b*, and the downsampling and mosaic operation 404*c*, in one or more embodiments, the warping operation 404*a* varies for different images of the image burst 400. In particular, the high-resolution image generation system 102 performs a different warping operation for each image (e.g., image frame) of the image burst 400 and the same blurring operation 404*b*, and the same downsampling and mosaic operation 404*c* for each frame of the image burst 400.

In one or more embodiments, the high-resolution image generation system 102 performs a first warping operation for the high-resolution image estimation (e.g., high-resolution image estimation 307 in FIG. 3) based on motion parameters of a first image utilized by the motion estimation model 406. Further, the high-resolution image generation system 102 performs a second warping operation for the high-resolution image estimation based on motion parameters of a second image utilized by the motion estimation model 406. In contrast, the high-resolution image generation system 102 performs a first blurring operation and a first mosaic operation for the high-resolution image estimation of a first image and a second image utilized by the motion estimation model.

Furthermore, although the discussion in FIGS. 3 and 4 shows the use of a single image burst, the high-resolution image generation system 102 optimizes a measure of loss over a large dataset (e.g., multiple image bursts). In some instances, the high-resolution image generation system 102 utilizes an iterative approach to optimizing the measure of loss over the large dataset. In particular, the high-resolution image generation system 102 batches multiple image bursts together and randomly shuffles frames within the image bursts. For instance, if the sensor noise for the multiple image bursts is independent and identically distributed random variable with zero-mean, and the motion distribution is sufficiently diverse to contain all sub-pixel shifts, then the high-resolution image generation system 102 can obtain an accurate prediction (e.g., ŷ=y). To illustrate, minimizing the reconstruction error loss function discussed in FIG. 3 over a large image burst dataset is equivalent to supervised training with the ground truth (e.g., y) with the assumption of diverse motion. Moreover, this equivalent holds even for an image burst of an image burst set with a small number of images (e.g., N=16).

FIGS. 3 and 4 show the high-resolution image generation system 102 training the image burst model and the image formation model. In one or more embodiments, post-training, the high-resolution image generation system 102 generates high-resolution images from an image burst. In particular, the high-resolution image generation system 102 captures an image burst that includes a plurality of images. For instance, the high-resolution image generation system 102 captures the image burst with an image capture device. Furthermore, after capturing the image burst, the high-resolution image generation system 102 generates a high-resolution image utilizing an image burst neural network. Additionally, the high-resolution image generation system 102 provides for display the generated high-resolution image in a graphical user interface. In one or more embodiments, during implementation of the high-resolution image generation system 102, the high-resolution image generation system 102 does not split the captured image burst as explained above during training. Rather, the high-resolution image generation system 102 generates a high-resolution image utilizing a trained image burst model from the entire image burst.

Furthermore, after providing for display the generated high-resolution image, the high-resolution image generation system 102 can provide additional processing tools for additional crispness or clarity of the high-resolution image. For example, the high-resolution image generation system 102 provides additional processing tools such as supervision with a high-resolution image that corresponds with a certain image capture device. In particular, the high-resolution image generation system 102 provides an option for a user of a client device to select a image capture device type. Based on a selection of the image capture device type, the high-resolution image generation system 102 uses weak supervision of the high-resolution image generated from the image burst model 402 for additional processing. For instance, the additional processing biases the generation of the image towards the selection of the image capture device type.

Figure 5:
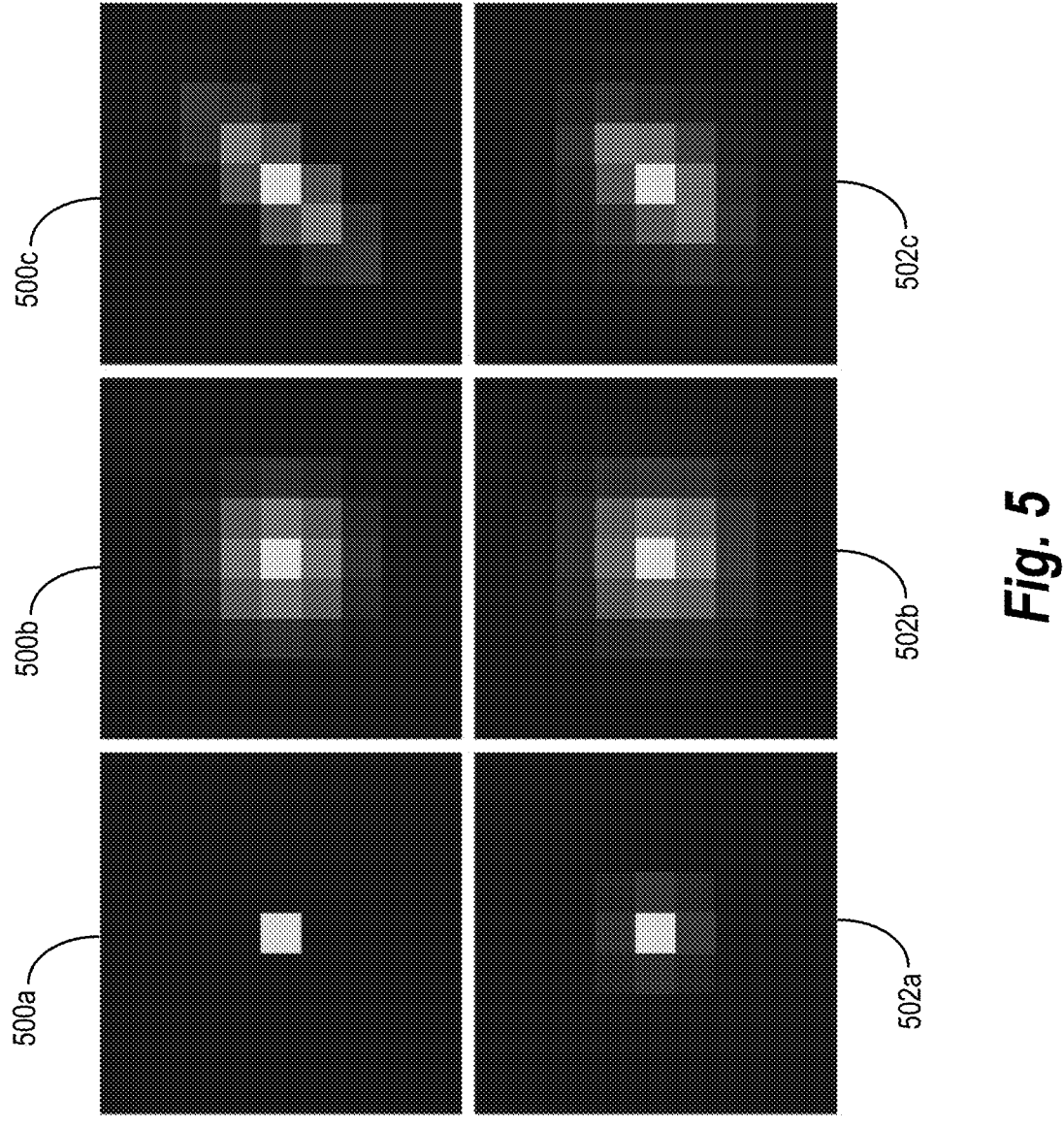
FIG. 5 illustrates example results of blur kernels for generating synthetic image bursts and blur kernels learned by the high-resolution image generation system in accordance with one or more embodiments.

FIG. 5 shows an overview comparison of synthetic datasets utilizing blur kernels to generate synthetic bursts and the high-resolution image generation system 102 learning blur kernels via self-supervision. For example, as mentioned above in FIG. 4, the high-resolution image generation system 102 modifies parameters of the blurring operation of the image formation model. Specifically, the high-resolution image generation system 102 learns the blur kernel associated with the lens blur based on the set of low-resolution images. For instance, rather than assuming the blur kernel or utilizing cumbersome and labor-intensive calibration methods to estimate the blur kernel, the high-resolution image generation system 102 learns the blur kernel from self-supervised training.

In one or more embodiments, the high-resolution image generation system 102 learns the blur kernel directly from the image burst data. In particular, the high-resolution image generation system 102 utilizes the image burst and the parameters of the image burst model to learn the blur kernel. Further, the high-resolution image generation system 102 initially utilizes an unnormalized 9×9 blur kernel. Moreover, the high-resolution image generation system 102 passes the unnormalized 9×9 blur kernel through a softmax operator to guarantee that the weights are non-negative and sum to 1. Accordingly, based on the determined measure of loss (e.g., via a comparison of the set of low-resolution images and the second subset of images from the image burst), the high-resolution image generation system 102 updates the initialized blur kernel. Thus, the high-resolution image generation system 102 learns the appropriate blur kernel (e.g., for the blur operation) tailored to each image capturing device.

FIG. 5 illustrates synthetic blur kernels 500a-500c. For example, the synthetic datasets utilize synthetic blur kernels 500a-500c to generate synthetic bursts. In particular, synthetic blur kernel 500a represents a unit impulse noise distribution, synthetic blur kernel 500b represents an isotropic Gaussian noise distribution, and synthetic blur kernel 500c represents anisotropic Gaussian noise distribution. Furthermore, FIG. 5 shows the learned blur kernels 502a-502c that also respectively correspond with unit impulse, isotropic Gaussian, and anisotropic Gaussian. Specifically, in FIG. 5, experimenters initialize the blur kernel with an isotropic Gaussian with a large standard deviation that does not match the true standard deviation The experimenters utilize the high-resolution image generation system 102 to learn the blur kernel with the parameters of the image burst model by minimizing the self-supervised reconstruction loss. FIG. 5 illustrates that the high-resolution image generation system 102 learns accurate blur kernels through its implemented self-supervision method. Specifically, FIG. 5 shows that self-supervised learning of the blur kernel by the high-resolution image generation system 102 results in blur kernels that accurately match that synthetic blur kernels 500a-500c.

FIG. 6 illustrates a comparison between the high-resolution image generation system 102 utilizing different combinations of blur kernels and noise distributions in accordance with one or more embodiments. For example, FIG. 6 shows a comparison table between various combinations. In particular, FIG. 6 shows different approaches with a corresponding peak signal-to-noise ratio (PSNR) where a higher PSNR indicates a higher quality. For instance, FIG. 6 shows different combinations where the scene motion (m_i) and the blur kernel (k) are either known or estimated. Furthermore, as a baseline, FIG. 6 also shows a comparison with a fully-supervised single-image super-resolution model 600 and a fully-supervised burst super-resolution model 602 trained using fully-supervised paired high-resolution ground truths.

As shown, FIG. 6 shows the approaches 604-610 as self-supervision approaches with various combinations of the blur kernel and the scene motion. In particular, the table in FIG. 6 shows that the self-supervised approach 604 is only 0.55 dB PSNR lower than the upper bound of the fully-supervised burst super-resolution model 602 in the worst case scenario. Even when the scene motion is unknown (e.g., approach 606), the PSNR scores are within 1.2 dB of the fully-supervised setting despite the high-resolution image generation system 102 self-supervised approach only utilizing noise low-resolution image bursts for training. Moreover, the self-supervised approaches 604-610 outperforms the fully supervised single-image super-resolution model 600 by around 2 dB.

Figure 7:
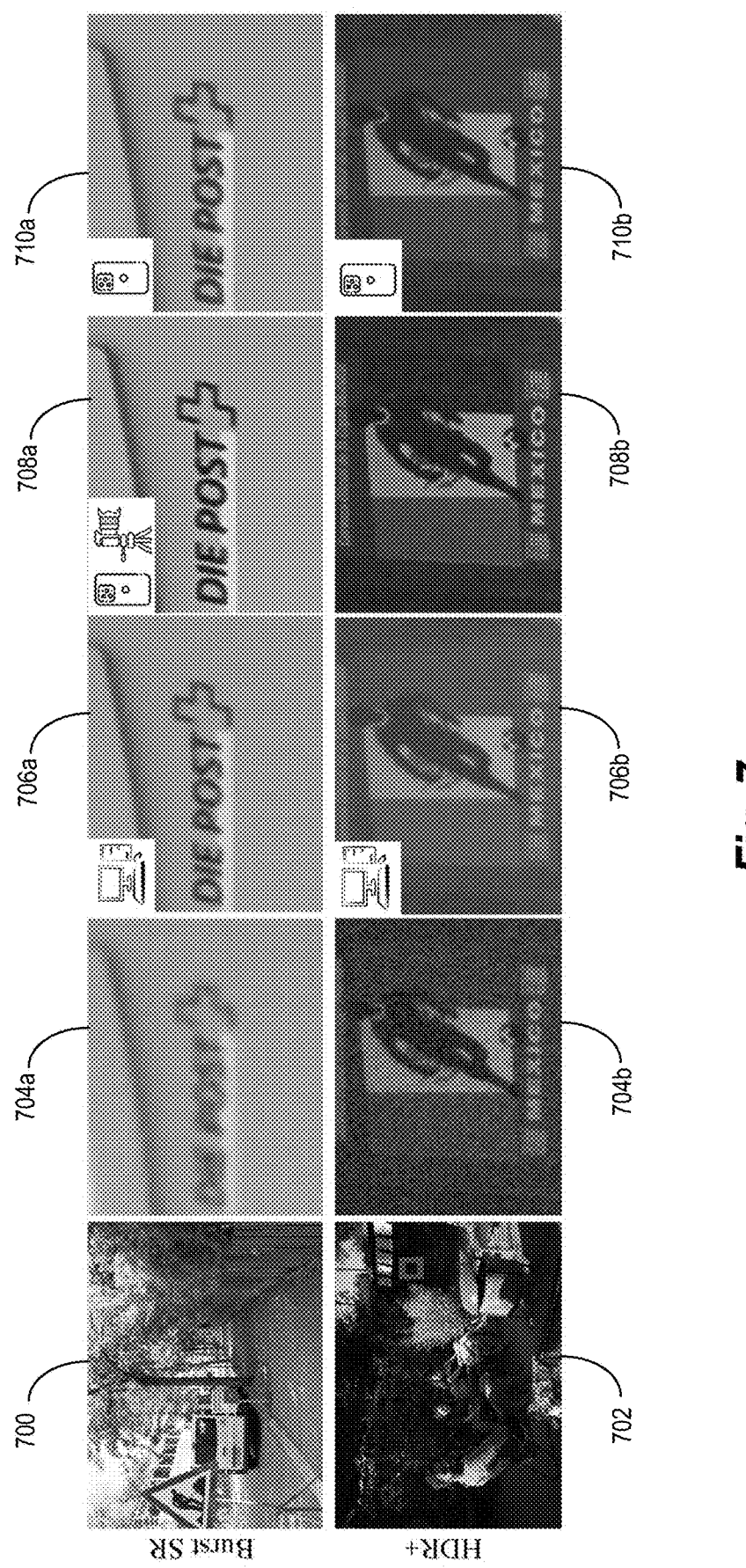
FIG. 7 illustrates example results of the high-resolution image generation system generating high-resolution images compared to existing strategies in accordance with one or more embodiments.

FIG. 7 illustrates results of the high-resolution image generation system 102 compared to conventional image capturing systems for both burst super-resolution datasets (burst SR) and high dynamic range plus datasets (HDR+). For context, HDR+ bursts cover a greater dynamic range than burst SR with bright highlights as well as dark shadows in the same image. Furthermore, the approach of weakly paired datasets is unable to use any images from HDR+since no high-resolution ground truth is available.

FIG. 7 shows a baseline image burst SR 700 that indicates the images in the top row are from burst SR. Also, FIG. 7 shows a HDR+ 702 that indicates that the images in the bottom row are from HDR+. For example, FIG. 7 shows an input image 704a and an input image 704b. Further, FIG. 7 compares different approaches with the input image 704a and the input image 704b. In particular, FIG. 7 shows synthetic images 706a and 706b, weakly-paired images 708a and 708b, and the self-supervised approach 710a and 710b utilized by the high-resolution image generation system 102 compared with the input images 704a and 704b. Accordingly, FIG. 7 illustrates a high fidelity and quality of the self-supervised approach as compared to conventional image capturing systems (e.g., synthetic images 706a and 706b, weakly-paired images 708a and 708b). The results shown in FIG. 7 are especially significant in the context of the high-resolution image generation system 102 exclusively training the image burst model with noisy low-resolution images.

Figure 8:
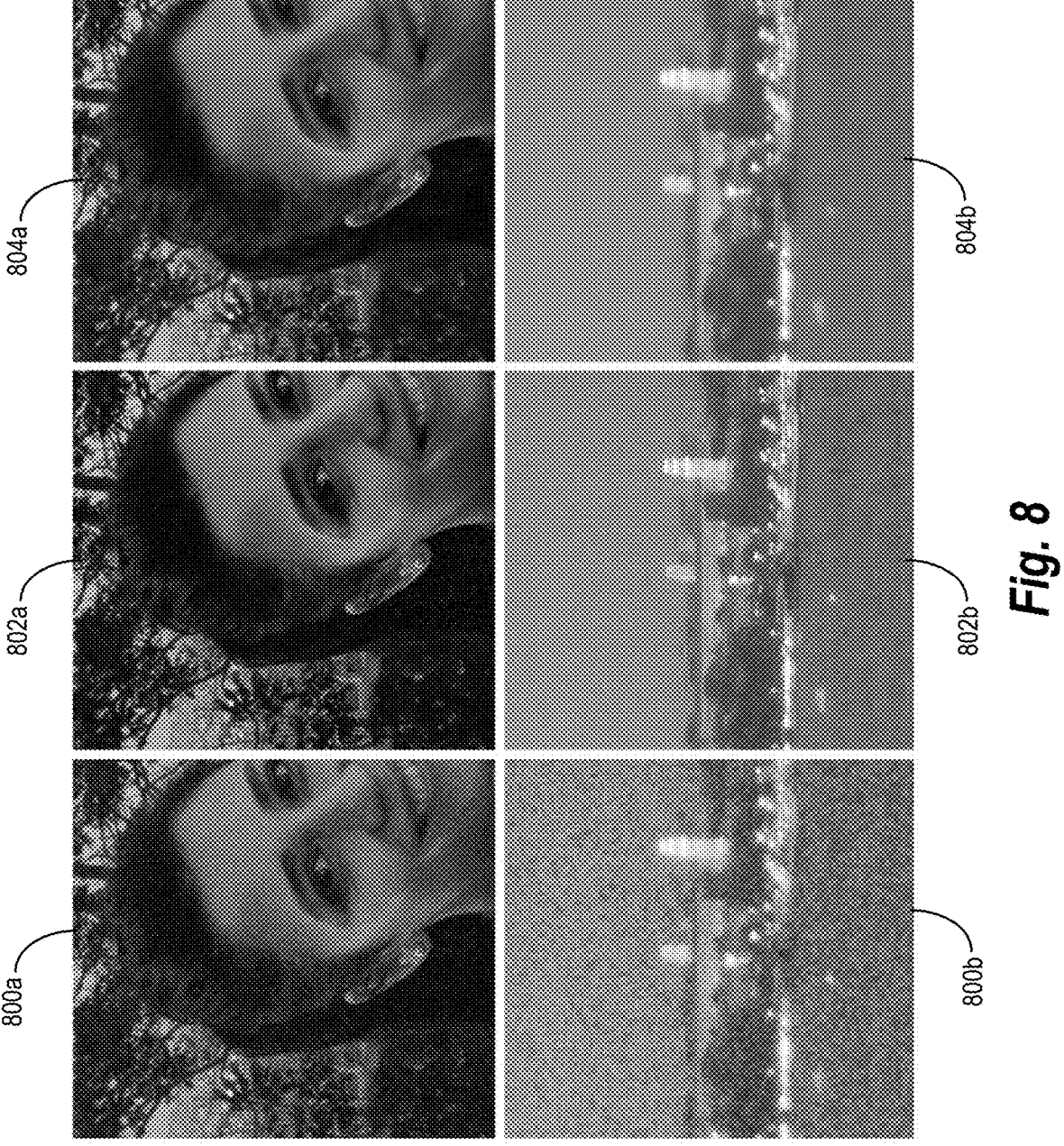
FIG. 8 illustrates example results of the high-resolution image generation system generating high-resolution images compared to weakly-paired images in accordance with one or more embodiments.

FIG. 8 illustrates the results of the self-supervised approach of the high-resolution image generation system 102 compared to weakly paired images in accordance with one or more embodiments. For example, FIG. 8 shows burst images 800a and 800b. Further, FIG. 8 shows a first weakly-paired image 802a and a second weakly-paired image 802b for comparison with the burst images 800a and 800b. As shown, the first and second weakly-paired images 802a and 802b demonstrate improvements in quality over the burst images 800a and 800b. However, FIG. 8 also shows a first self-supervised image 804a and a second self-supervised image 804b which demonstrates a superior signal-to-noise ratio at a higher resolution as compared to the weakly paired images 802a and 802b. Notable, the weakly paired images 802a and 802b show visible splotches while the first self-supervised image 804a and the second self-supervised image 804b do not.

Figure 9A:
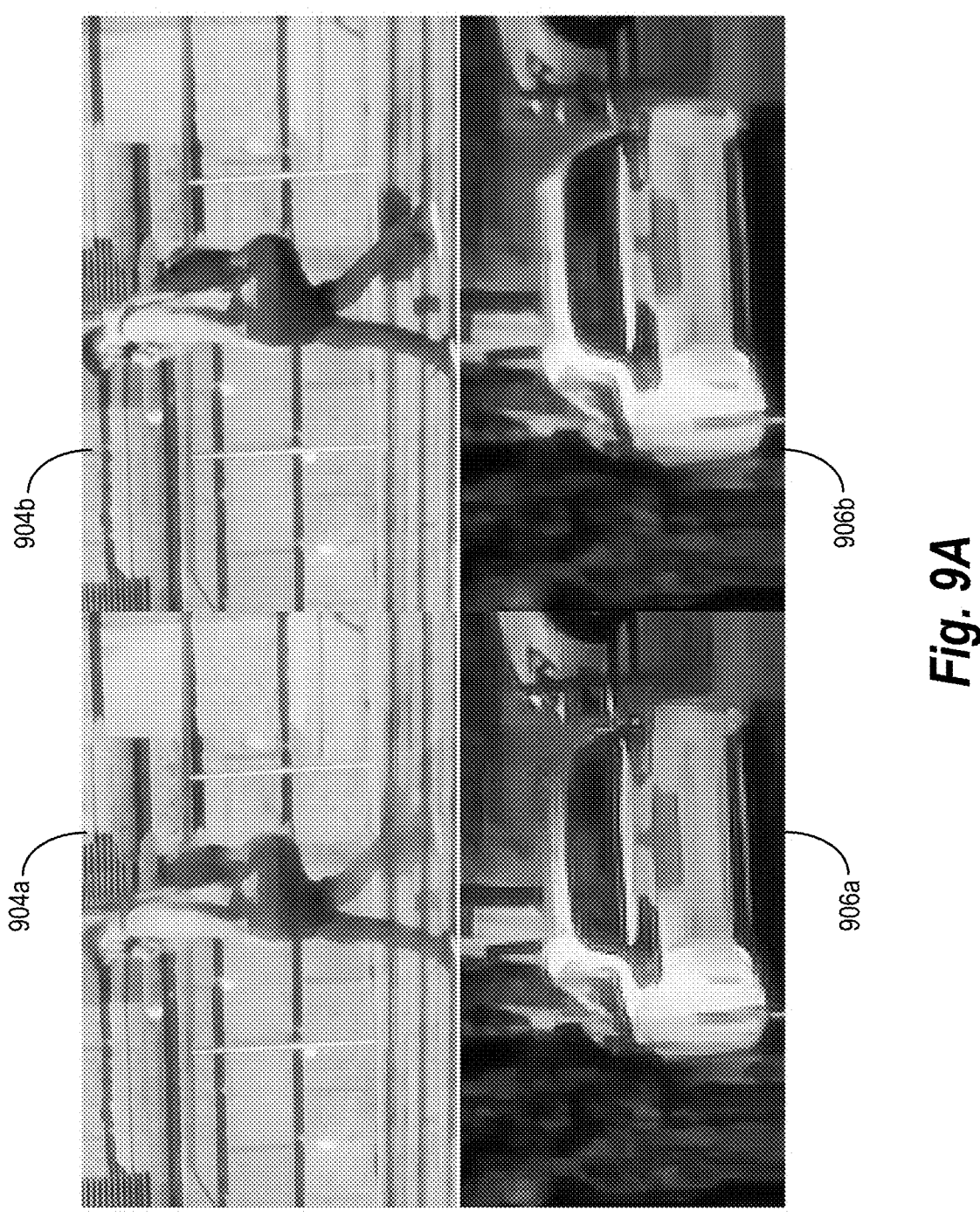
FIGS. 9A-9B illustrates example results of ablation studies for the high-resolution image generation system in accordance with one or more embodiments.
Figure 9B:
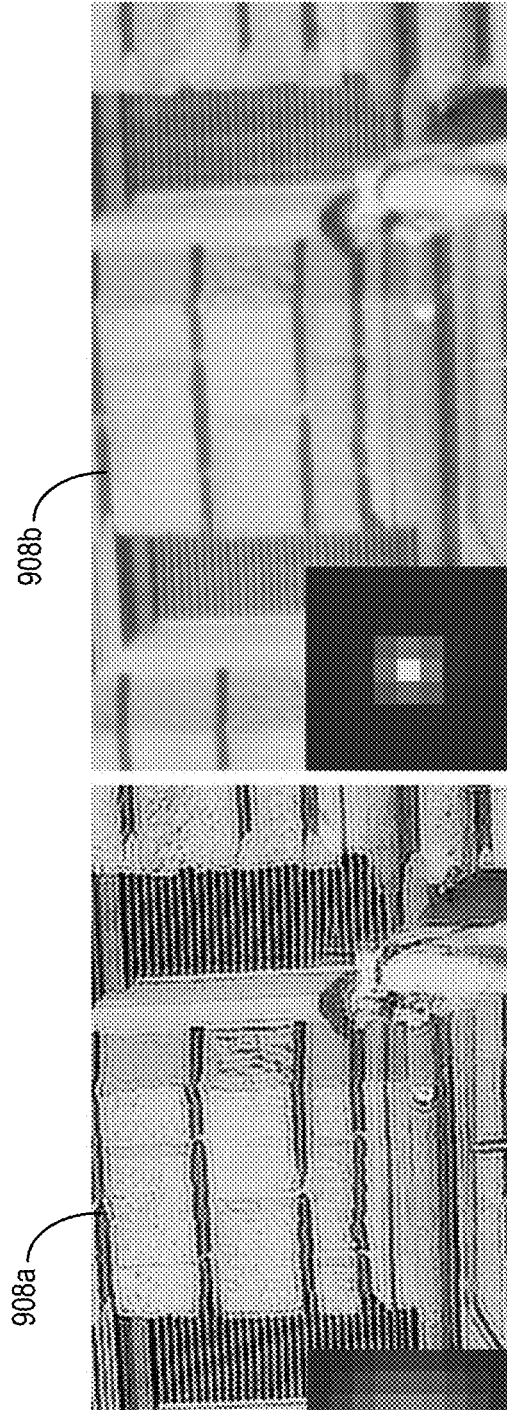

FIGS. 9A-9B illustrates results in ablation studies in accordance with one or more embodiments. FIG. 9A shows a comparison between self-supervised training by the high-resolution image generation system 102 with and without validity masks. In particular, FIG. 9A shows a first image 904*a* and a second image 906*a* both trained without validity masks. In comparison with a first image 904*b* and a second image 906*b* trained with validity masks, the images trained without validity masks show ghosting artifacts around moving objects. Accordingly, the high-resolution image generation system 102 training with validity masks is an important aspect to eliminate ghosting artifacts around moving objects and generating high-resolution images.

FIG. 9B shows a comparison between the high-resolution image generation system 102 utilizing an incorrect blur kernel versus the high-resolution image generation system 102 learning the blur kernel through self-supervised training. For example, FIG. 9B shows a first image 908*a* with the incorrect kernel and a second image 908*b* with a learned blur kernel. In particular, the incorrect kernel drastically effects the quality of the generated image. Accordingly, the high-resolution image generation system 102 learning the blur kernel through self-supervision methods assist the high-resolution image generation system 102 in generating high-resolution images.

Figure 10:
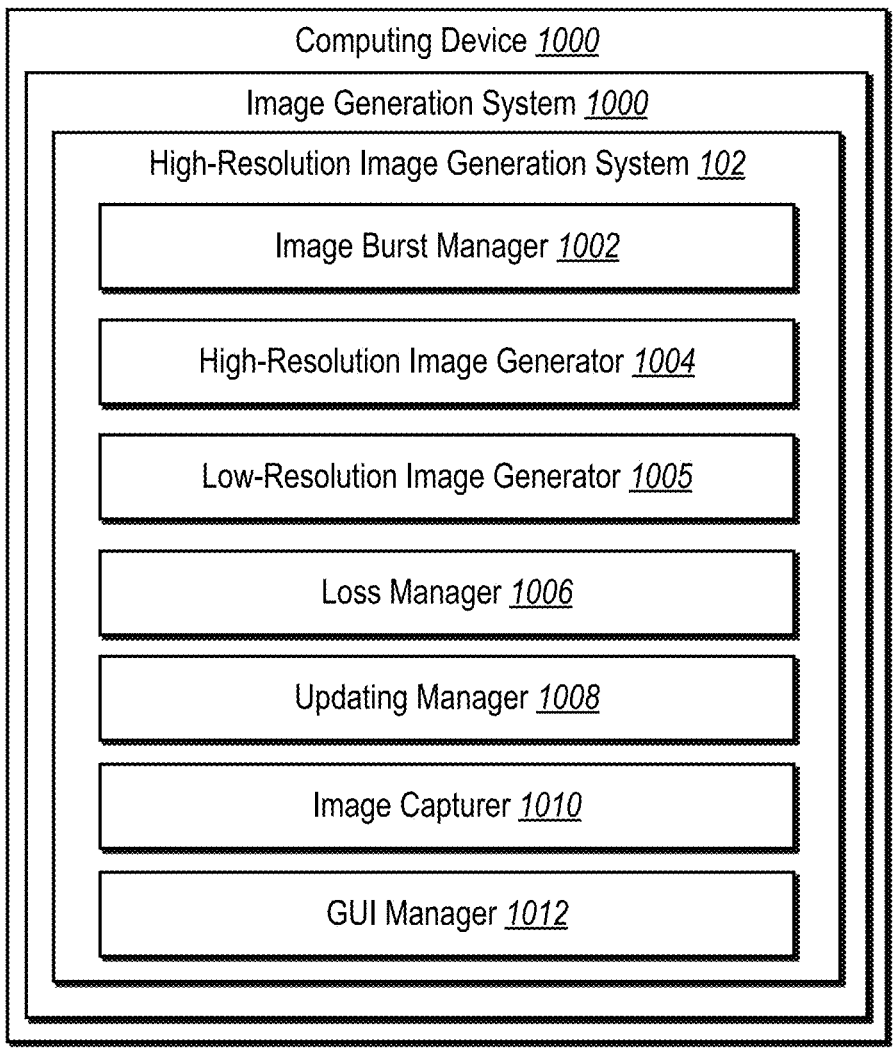
FIG. 10 illustrates an example schematic diagram of the transparency properties system in accordance with one or more embodiments.

Turning to FIG. 10, additional detail will now be provided regarding various components and capabilities of the high-resolution image generation system 102. In particular, FIG. 9 illustrates an example schematic diagram of a computing device 1000 (e.g., the server(s) 106 and/or the client device 112) implementing the high-resolution image generation system 102 in accordance with one or more embodiments of the present disclosure for components 1000-1012. As illustrated in FIG. 10, the high-resolution image generation system 102 includes an image burst manager 1002, a high-resolution image generator 1004, a low-resolution image generator, a loss manager 1006, an updating manager 1008, an image capturer 1010, and a GUI manager 1012.

The image burst manager 1002 stores image bursts that include a plurality of images. For example, the image burst manager 1002 stores an image burst after the high-resolution image generation system 102 either captures the image burst or receives an image burst from another data store. In some instances, the image burst manager 1002 accesses an image burst from another device. Moreover, the image burst manager 1002 passes one or more image burst to the high-resolution image generation system 102 for training the image burst model and other components such as the image formation model.

The high-resolution image generator 1004 generates high-resolution image estimations from the image burst. For example, the high-resolution image generator 1004 receives the image burst from the image burst manager 1002. In particular, the high-resolution image generator 1004 generates a high-resolution image estimation for training and generates a high-resolution image post-training. Moreover, the high-resolution image generator 1004 passes the high-resolution image generator 1004 to the low-resolution image generator 1005.

The low-resolution image generator 1005 generates a set of low-resolution images. For example, the low-resolution image generator 1005 receives the high-resolution image estimation and generates a set of low-resolution images based on parameters from one or more images of the image burst. In particular, the low-resolution image generator 1005 passes the set of low-resolution images to the loss manager 1006.

The loss manager 1006 determines a measure of loss. For example, the loss manager 1006 determines the measure of loss by comparing the set of low-resolution images with a second subset of images from the image burst. In particular, the loss manager 1006 determines the measure of loss by applying a loss function. The loss manager 1006 further passes the determined measure of loss to the updating manager 1008.

The updating manager 1008 updates the image burst model. For example, the updating manager 1008 updates parameters of the image burst model (or in some instances the image burst neural network) based on the determined measure of loss. The updating manager 1008 also updates the image formation model. In particular, the updating manager 1008 updates the blurring operation of the image formation model based on the determined measure of loss.

The image capturer 1010 captures an image burst. For example, the image capturer 1010 captures an image burst that includes a plurality of images. In particular, the image capturer 1010 utilizes an image capturing application of an image capture device. Furthermore, after the image capturer 1010 captures an image burst, the image capturer 1010 passes the image burst to the high-resolution image generator 1004 to generate a high-resolution image.

The GUI manager 1012 provides for display the high-resolution image. For example, the GUI manager 1012 receives the high-resolution image from the image capturer 1010 and/or the high-resolution image generator 1004 and provides for display the high-resolution image on a graphical user interface.

Each of the components 1002-1012 of the high-resolution image generation system 102 can include software, hardware, or both. For example, the components 1002-1012 can include one or more instructions stored on a computer-readable storage medium and executable by processors of one or more computing devices, such as a client device or server device. When executed by the one or more processors, the computer-executable instructions of the high-resolution image generation system 102 can cause the computing device(s) to perform the methods described herein. Alternatively, the components 1002-1012 can include hardware, such as a special-purpose processing device to perform a certain function or group of functions. Alternatively, the components 1002-1012 of the high-resolution image generation system 102 can include a combination of computer-executable instructions and hardware.

Furthermore, the components 1002-1012 of the high-resolution image generation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1012 of the high-resolution image generation system 102 may be implemented as a stand-alone application, such as a desktop or mobile application. Furthermore, the components 1002-1012 of the high-resolution image generation system 102 may be implemented as one or more web-based applications hosted on a remote server. Alternatively, or additionally, the components 1002-1012 of the high-resolution image generation system 102 may be implemented in a suite of mobile device applications or "apps." For example, in one or more embodiments, the high-resolution image generation system 102 can comprise or operate in connection with digital software applications such as ADOBE® PHOTOSHOP, ADOBE® LIGHTROOM, ADOBE® AFTER EFFECTS, ADOBE® PREMIERE PRO, ADOBE® PREMIERE RUSH, ADOBE SPARK VIDEO, and/or ADOBE® PREMIERE. The foregoing are either registered trademarks or trademarks of Adobe Inc. in the United States and/or other countries.

FIGS. 1-10, the corresponding text, and the examples provide a number of different methods, systems, devices, and non-transitory computer-readable media of the high-resolution image generation system 102. In addition to the foregoing, one or more embodiments can also be described in terms of flowcharts comprising acts for accomplishing the particular result, as shown in FIG. 11. FIG. 11 may be performed with more or fewer acts. Further, the acts may be performed in different orders. Additionally, the acts described herein may be repeated or performed in parallel with one another or in parallel with different instances of the same or similar acts.

FIG. 11 illustrates a flowchart of a series of acts 1100 for updating the image burst neural network in accordance with one or more embodiments. FIG. 11 illustrates acts according to one embodiment, alternative embodiments may omit, add to, reorder, and/or modify any of the acts shown in FIG. 11. In some implementations, the acts of FIG. 11 are performed as part of a method. For example, in some embodiments, the acts of FIG. 11 are performed as part of a computer-implemented method. Alternatively, a non-transitory computer-readable medium can store instructions thereon that, when executed by at least one processor, cause a computing device to perform the acts of FIG. 11. In some embodiments, a system performs the acts of FIG. 11. For example, in one or more embodiments, a system includes at least one memory device. The system further includes at least one server device configured to cause the system to perform the acts of FIG. 11.

The series of acts 1100 includes an act 1102 of accessing an image burst, an act 1104 of generating a high-resolution image estimation from the image burst, an act 1106 of generating a set of low-resolution images by modifying the high-resolution image estimation, an act 1108 of determining a measure of loss by comparing the set of low-resolution images with a second subset of images, and an act 1110 of updating the image burst neural network by back-propagating the measure of loss.

In particular, the act 1102 can include accessing an image burst comprising a plurality of images, the act 1104 can include generating, utilizing an image burst neural network, a high-resolution image estimation from a first subset of images of the plurality of images, the act 1106 can include generating a set of low-resolution images by modifying the high-resolution image estimation based on parameters of one or more images from the plurality of images, the act 1108 can include determining a measure of loss by comparing the set of low-resolution images with a second subset of images of the plurality of images, and the act 1110 can include updating the image burst neural network by back-propagating the measure of loss to the image burst neural network.

For example, in one or more embodiments, the series of acts 1100 includes partitioning the plurality of images into the first subset of images and the second subset of images, the plurality of images comprising low-resolution images. In addition, in one or more embodiments, the series of acts 1100 includes utilizing a motion estimation model, motion parameters of one or more images of the plurality of images. Further, in one or more embodiments, the series of acts 1100 includes performing a warping operation on the high-resolution image estimation by utilizing an image formation model.

Moreover, in one or more embodiments, the series of acts 1100 includes modifying the high-resolution image estimation with the warping operation based on motion parameters of one or more of the plurality of images. Additionally, in one or more embodiments, the series of acts 1100 includes performing a blurring operation on the high-resolution image estimation and downsampling the high-resolution image estimation for performing a mosaic operation on different resolutions of the high-resolution image estimation.

Furthermore, in one or more embodiments, the series of acts 1100 includes updating the image formation model by modifying a blurring operation based on the determined measure of loss. Additionally, in one or more embodiments, the series of acts 1100 includes utilizing validity masks for one or more of the images of the plurality of images, wherein the validity masks incorporate dynamic object motion within the image burst and determining the measure of loss utilizing the validity masks for the one or more images of the plurality of images.

Moreover, in one or more embodiments, the series of acts 1100 includes accessing an image burst comprising a first subset of images and a second subset of images, generating, utilizing an image burst machine-learning model, a high-resolution image estimation from the first subset of images, modifying, utilizing an image formation machine-learning model, the high-resolution image estimation based on motion parameters of one or more images of the image burst, generating, utilizing the image formation machine-learning model, a set of low-resolution images from the modified high-resolution image estimation, determining a measure of reconstruction loss by comparing the set of low-resolution images with the second subset of images, and back-propagating the measure of reconstruction loss to an operation of the image formation machine-learning model and the image burst machine-learning model.

In addition, in one or more embodiments, the series of acts 1100 includes randomly partitioning the image burst into the first subset of images and the second subset of images. Further, in one or more embodiments, the series of acts 1100 determining, utilizing a motion estimation model, motion parameters of one or more images of the image burst, wherein the motion parameters incorporate movement of objects in one or more images of the image burst relative to one or more other images of the image burst.

Moreover, in one or more embodiments, the series of acts 1100 includes utilizing an image formation model to: perform a warping operation on the high-resolution image estimation, perform a blurring operation on the high-resolution image estimation, and downsample the high-resolution image estimation for performing a mosaic operation on different resolutions of the high-resolution image estimation, wherein the mosaic operation includes dropping two color channels at each pixel of the high-resolution image estimation.

Furthermore, in one or more embodiments, the series of acts 1100 includes performing a first warping operation for the high-resolution image estimation based on motion parameters of a first image utilized by a motion estimation model and performing a second warping operation for the high-resolution image estimation based on motion parameters of a second image utilized by the motion estimation model. Additionally, in one or more embodiments, the series of acts 1100 includes performing a first blurring operation and a first mosaic operation for the high-resolution image estimation of a first image utilized by a motion estimation model and performing the first blurring operation and the first mosaic operation for the high-resolution image estimation of a second image utilized by the motion estimation model. Moreover, in one or more embodiments, the series of acts 1100 includes utilizing validity masks for one or more images of the image burst, wherein the validity masks indicate pixel values of the one or more images of the image burst for determining the measure of reconstruction loss and determining the measure of reconstruction loss utilizing the validity masks.

In addition to the foregoing, one or more embodiments can also be described in terms of flowcharts comprising acts for accomplishing the particular result, as shown in FIG. 11. FIG. 11 may be performed with more or fewer acts. Further, the acts may be performed in different orders. Additionally, the acts described herein may be repeated or performed in parallel with one another or in parallel with different instances of the same or similar acts.

FIG. 12 illustrates a flowchart of a series of acts 1200 for generating high-resolution images in accordance with one or more embodiments. FIG. 12 illustrates acts according to one embodiment, alternative embodiments may omit, add to, reorder, and/or modify any of the acts shown in FIG. 12. In some implementations, the acts of FIG. 12 are performed as part of a method. For example, in some embodiments, the acts of FIG. 12 are performed as part of a computer-implemented method. Alternatively, a non-transitory computer-readable medium can store instructions thereon that, when executed by at least one processor, cause a computing device to perform the acts of FIG. 12. In some embodiments, a system performs the acts of FIG. 12. For example, in one or more embodiments, a system includes at least one memory device. The system further includes at least one server device configured to cause the system to perform the acts of FIG. 12.

The series of acts 1200 includes an act 1202 of capturing an image burst utilizing an image capture device, an act 1204 of generating a high-resolution image from the image burst utilizing an image burst neural network, and an act 1206 of displaying the high-resolution image. In particular, the act 1202 includes capturing an image burst comprising a plurality of images utilizing an image capture device, the act 1204 includes generating a high-resolution image from the image burst utilizing an image burst neural network trained exclusively with low-resolution images captured by the image capture device, and the act 1206 includes displaying the high-resolution image in a graphical user interface.

Further, the series of acts 1200 in one or more embodiments includes capturing dynamic motion of objects within one or more of the plurality of images from the image burst. Additionally, the series of acts 1200 in one or more embodiments includes generating the high-resolution image by processing the plurality of images from the image burst comprising dynamic motion of objects via the image burst neural network. Moreover, the series of acts 1200 in one or more embodiments includes generating, utilizing the image burst neural network, a high-resolution image estimation from a first subset of images of the plurality of images and generating a set of low-resolution images by modifying the high-resolution image estimation based on parameters of one or more images of the plurality of images. Additionally, the series of acts 1200 in one or more embodiments includes determining a measure of loss by comparing the set of low-resolution images with a second subset of images of the plurality of images and updating the image burst neural network by back-propagating the measure of loss to the image burst neural network.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
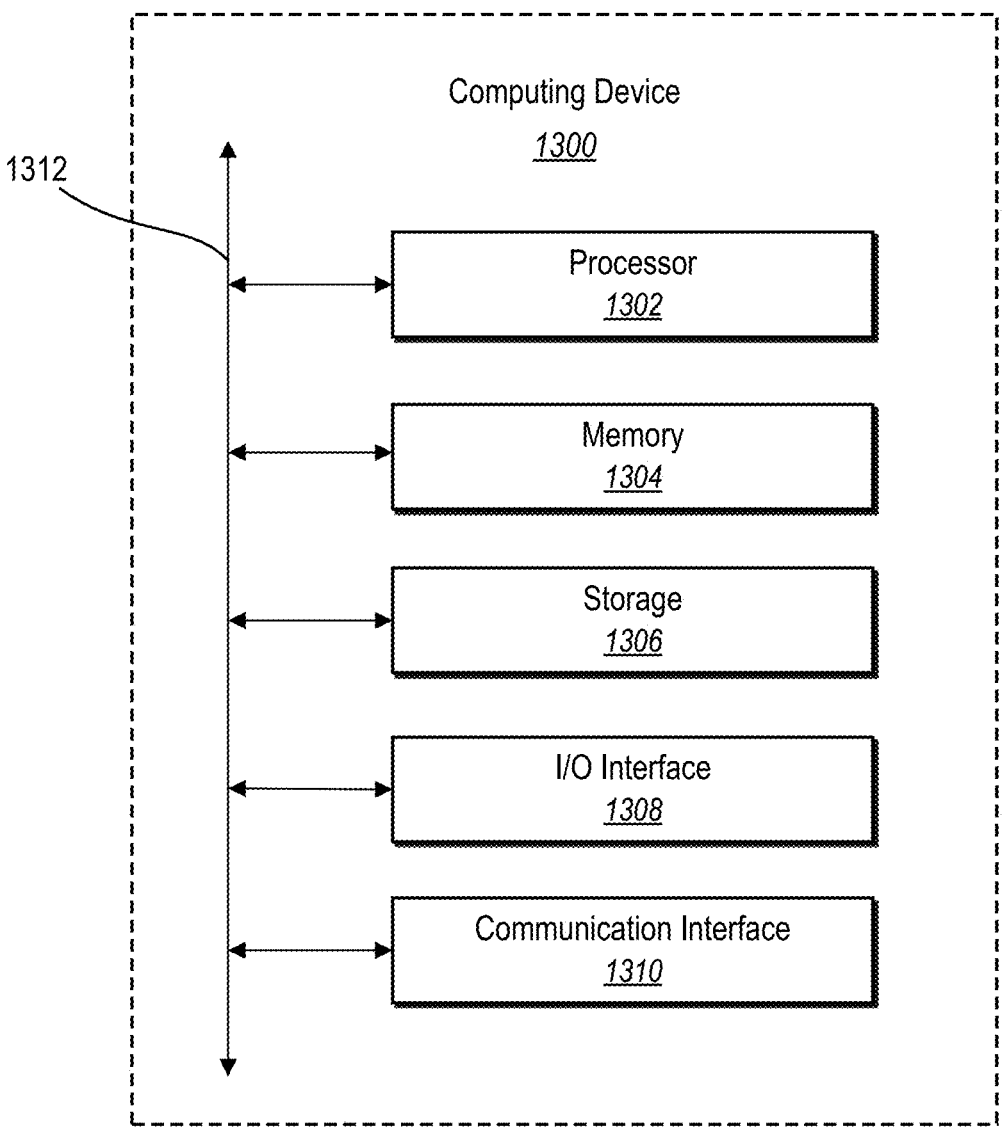
FIG. 13 illustrates a block diagram of an exemplary computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., the server(s) 106 and/or the client device 112). In one or more embodiments, the computing device 1300 may be a mobile device (e.g., a mobile telephone, a smartphone, a PDA, a tablet, a laptop, a camera, a tracker, a watch, a wearable device). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 including storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

accessing an image burst comprising a plurality of images;

partitioning the plurality of images into a first subset of images and a second subset of images;

generating, utilizing an image burst neural network, a high-resolution image estimation from the first subset of images of the plurality of images;

generating a set of reconstructed low-resolution images by modifying the high-resolution image estimation based on parameters of one or more images from the plurality of images;

determining a measure of loss by comparing the set of reconstructed low-resolution images with the second subset of images of the plurality of images; and updating the image burst neural network by back-propagating the measure of loss to the image burst neural network.

2. The method of claim 1, wherein accessing the image burst comprising the plurality of images comprises accessing a plurality of noisy low-resolution images.

3. The method of claim 1, wherein generating the set of reconstructed low-resolution images further comprises determining, utilizing a motion estimation model, motion parameters of one or more images of the plurality of images.

4. The method of claim 1, wherein generating the set of reconstructed low-resolution images further comprises performing a warping operation on the high-resolution image estimation by utilizing an image formation model.

5. The method of claim 4, further comprising modifying the high-resolution image estimation with the warping operation based on motion parameters of one or more of the plurality of images.

6. The method of claim 4, further comprising:

performing a blurring operation on the high-resolution image estimation; and downsampling the high-resolution image estimation for performing a mosaic operation on different resolutions of the high-resolution image estimation.

7. The method of claim 4, further comprising updating the image formation model by modifying a blurring operation based on the determined measure of loss.

8. The method of claim 1, wherein determining the measure of loss further comprises:

utilizing validity masks for one or more of the images of the plurality of images, wherein the validity masks indicate pixel values of one or more images of the image burst for determining the measure of loss; and determining the measure of loss utilizing the validity masks for the one or more images of the plurality of images.

9. A system comprising:

one or more memory components; and one or more processing devices coupled to the one or more memory components, the one or more processing devices to perform operations comprising:

accessing an image burst comprising a plurality of images;

partitioning the plurality of images into a first subset of images and a second subset of images;

generating, utilizing an image burst machine-learning model, a high-resolution image estimation from the first subset of images;

modifying, utilizing an image formation machine-learning model, the high-resolution image estimation based on motion parameters of one or more images of the image burst;

generating, utilizing the image formation machine-learning model, a set of reconstructed low-resolution images from the modified high-resolution image estimation;

determining a measure of reconstruction loss by comparing the set reconstructed of low-resolution images with the second subset of images; and back-propagating the measure of reconstruction loss to an operation of the image formation machine-learning model and the image burst machine-learning model.

10. The system of claim 9, wherein partitioning the plurality of images comprises randomly partitioning the image burst into the first subset of images and the second subset of images.

11. The system of claim 9, wherein generating the set of reconstructed low-resolution images further comprises determining, utilizing a motion estimation model, motion parameters of one or more images of the image burst, wherein the motion parameters incorporate movement of objects in one or more images of the image burst relative to one or more other images of the image burst.

12. The system of claim 9, wherein generating the set of reconstructed low-resolution images further comprises:

utilizing an image formation model to:

perform a warping operation on the high-resolution image estimation;

perform a blurring operation on the high-resolution image estimation; and downsample the high-resolution image estimation for performing a mosaic operation on different resolutions of the high-resolution image estimation, wherein the mosaic operation includes dropping two color channels at each pixel of the high-resolution image estimation.

13. The system of claim 12, the operations further comprising:

performing a first warping operation for the high-resolution image estimation based on motion parameters of a first image utilized by a motion estimation model; and performing a second warping operation for the high-resolution image estimation based on motion parameters of a second image utilized by the motion estimation model.

14. The system of claim 12, the operations further comprising:

performing a first blurring operation and a first mosaic operation for the high-resolution image estimation of a first image utilized by a motion estimation model; and performing the first blurring operation and the first mosaic operation for the high-resolution image estimation of a second image utilized by the motion estimation model.

15. The system of claim 9, wherein the operations further comprise:

utilizing validity masks for one or more images of the image burst, wherein the validity masks indicate pixel values of the one or more images of the image burst for determining the measure of reconstruction loss; and determining the measure of reconstruction loss utilizing the validity masks.

16. A non-transitory computer-readable medium storing executable instructions which, when executed by at least one processing device, cause the at least one processing device to perform operations comprising:

capturing an image burst comprising a plurality of images utilizing an image capture device;

generating a high-resolution image from the image burst utilizing an image burst neural network trained exclusively with low-resolution images captured by the image capture device; and displaying the high-resolution image in a graphical user interface.

17. The non-transitory computer-readable medium of claim 16, wherein capturing the image burst comprises capturing dynamic motion of objects within one or more of the plurality of images from the image burst.

18. The non-transitory computer-readable medium of claim 17, wherein the operations further comprise generating the high-resolution image by processing the plurality of images from the image burst comprising dynamic motion of objects via the image burst neural network.

19. The non-transitory computer-readable medium of claim 16, wherein the image burst neural network is trained by:

generating, utilizing the image burst neural network, a high-resolution image estimation from a first subset of images of the plurality of images; and generating a set of low-resolution images by modifying the high-resolution image estimation based on parameters of one or more images of the plurality of images.

20. The non-transitory computer-readable medium of claim 19, wherein the image burst neural network is trained by:

determining a measure of loss by comparing the set of low-resolution images with a second subset of images of the plurality of images; and updating the image burst neural network by back-propagating the measure of loss to the image burst neural network.

* * * * *